United States Patent [19]
Pon

[11] Patent Number: 5,949,815
[45] Date of Patent: Sep. 7, 1999

[54] CODE MULTIPATH REDUCTION USING WEIGHTED CORRELATION CHANNELS

[75] Inventor: Rayman W. Pon, Cupertino, Calif.

[73] Assignee: Trimble Navigation Limited, Sunnyvale, Calif.

[21] Appl. No.: 08/742,892

[22] Filed: Nov. 1, 1996

[51] Int. Cl.⁶ .................................. H04B 1/10; H04L 7/00
[52] U.S. Cl. ............................................ 375/208; 375/367
[58] Field of Search ...................................... 375/209, 346, 375/347, 349, 285, 200, 208, 367

[56] References Cited

U.S. PATENT DOCUMENTS

| | | | |
|---|---|---|---|
| 5,402,450 | 3/1995 | Lennen | 375/343 |
| 5,630,208 | 5/1997 | Enge et al. | 455/65 |

*Primary Examiner*—Don N. Vo
*Assistant Examiner*—Albert C. Park
*Attorney, Agent, or Firm*—Boris G. Tankhilevich

[57] ABSTRACT

The apparatus and method for minimization the residual multipath pseudorange error signal present in the received composite spread spectrum signal are disclosed. In the preferred embodiment, the apparatus comprises at least two tracking channels. Each tracking channel includes a generator of a time-varying non-uniform weighting function. Each tracking channel processes an incoming composite signal and outputs a satellite signal and a multipath pseudorange error signal. The tracking channel output signals are scaled by the computer and combined to yield the output signal comprising a satellite signal and a minimized multipath pseudorange error signal in the area of small delays.

3 Claims, 25 Drawing Sheets

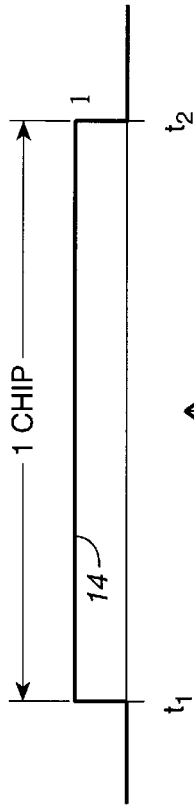
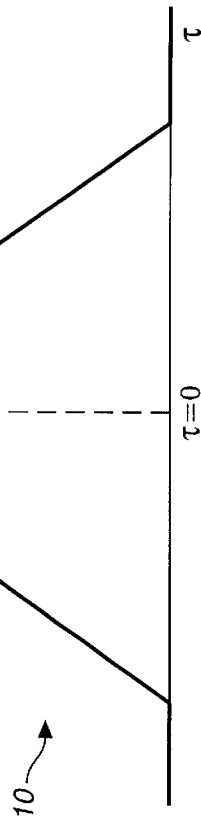
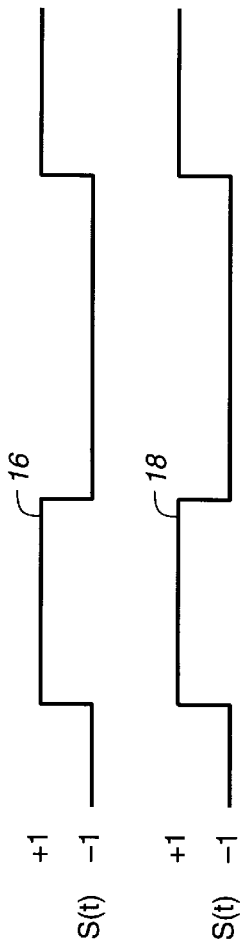
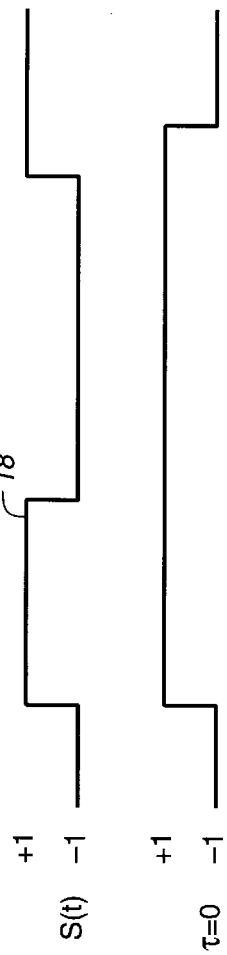

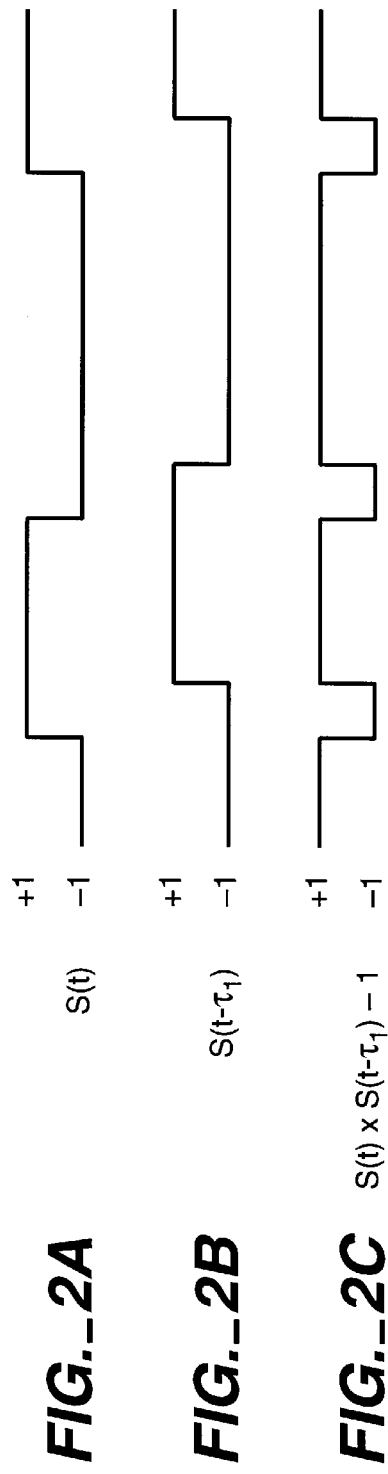
FIG._2A $S(t)$
FIG._2B $S(t-\tau_1)$
FIG._2C $S(t) \times S(t-\tau_1) - 1$
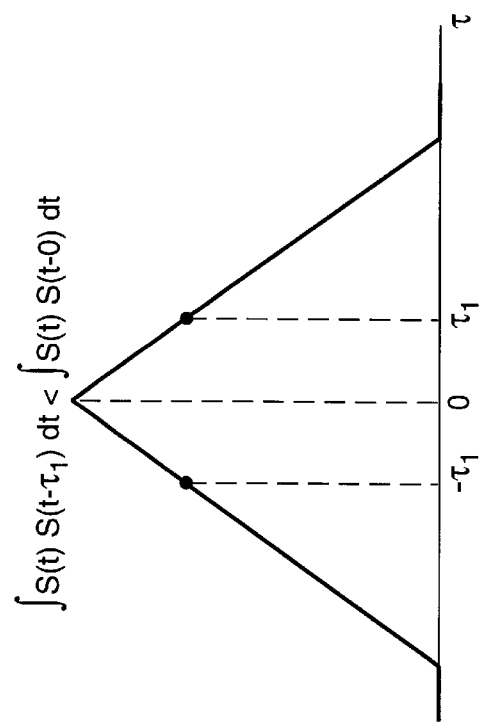
FIG._2D

FIG._3A 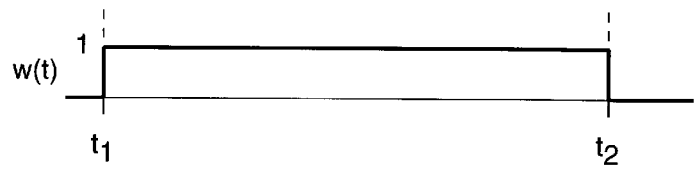
FIG._3B 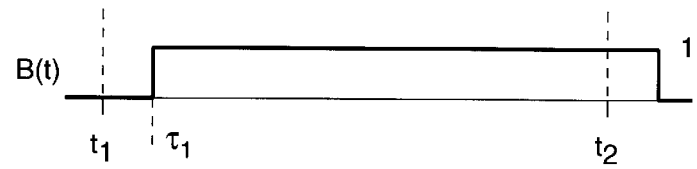
FIG._3C 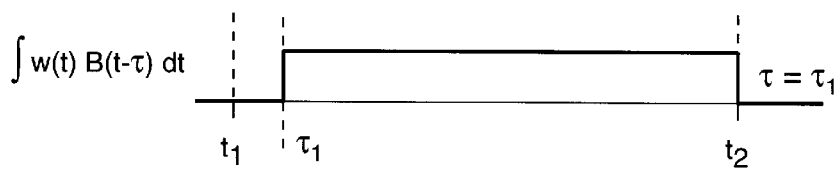

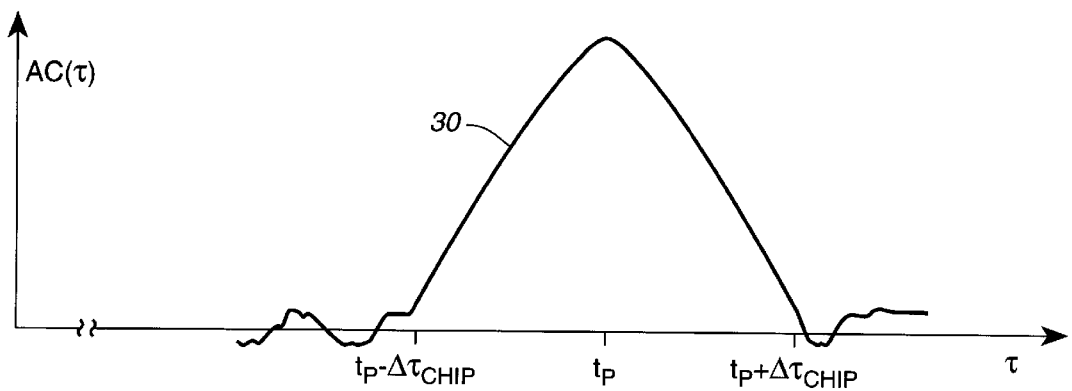
FIG._4A
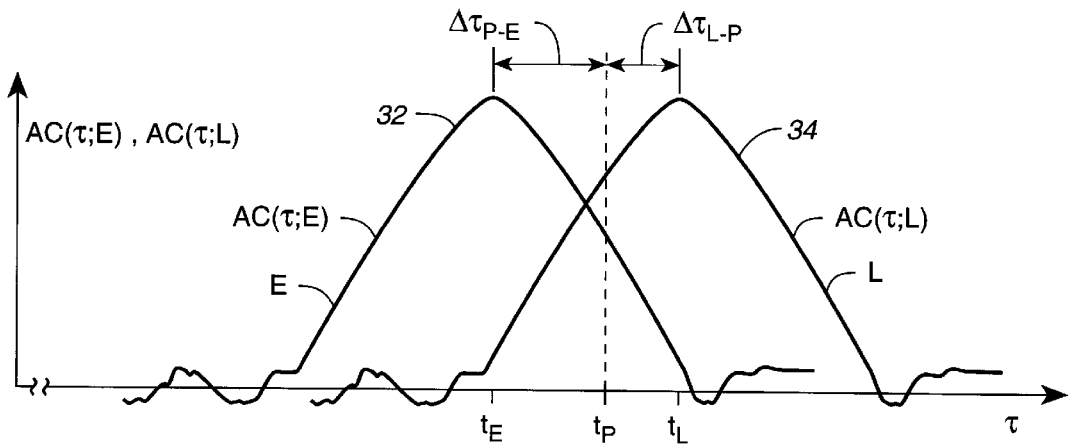
FIG._4B
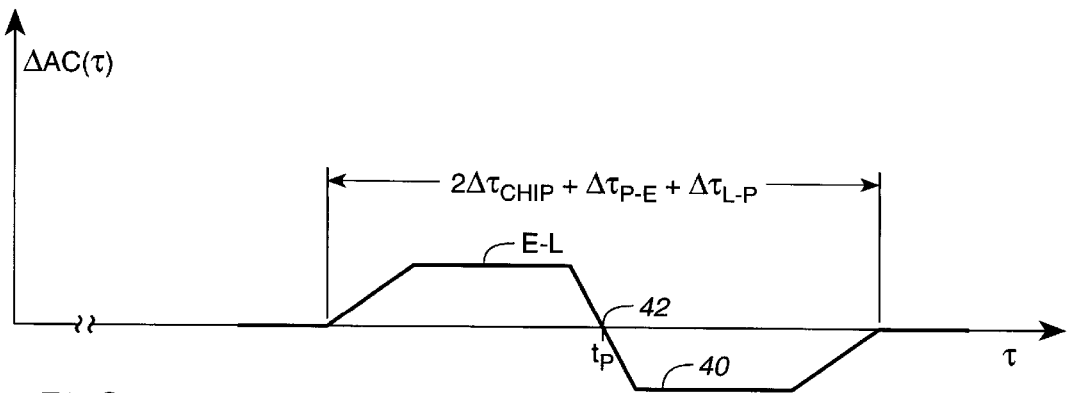
FIG._4C

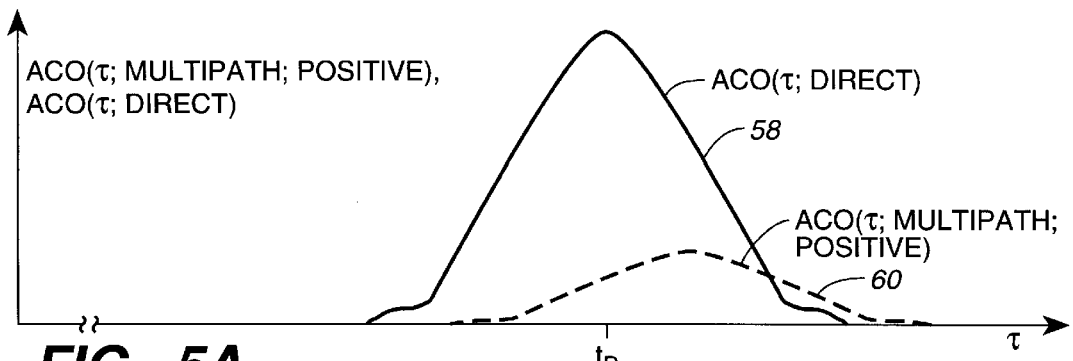
FIG._5A
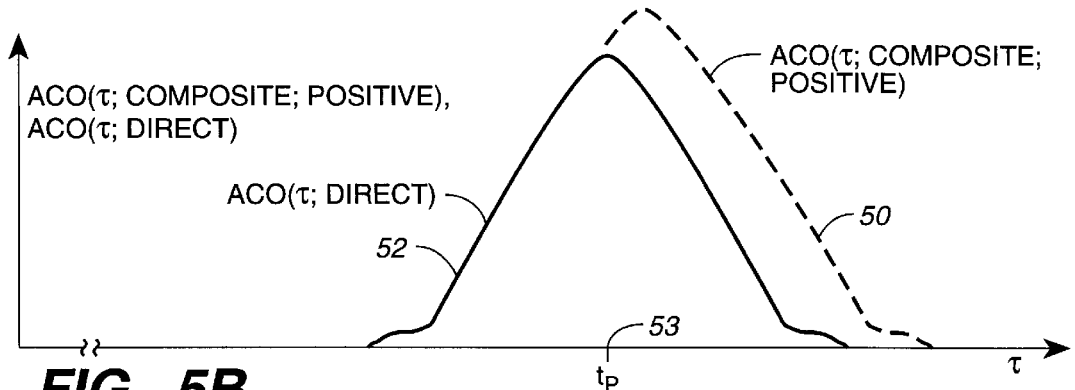
FIG._5B
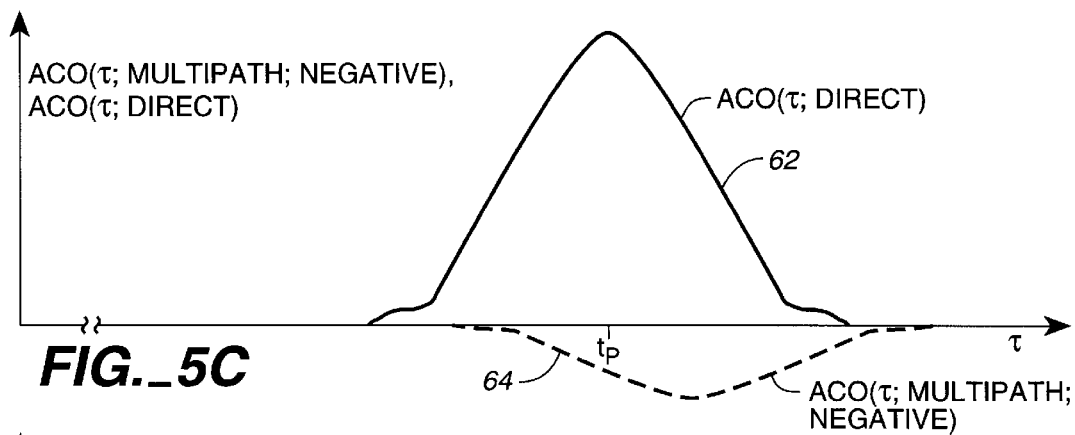
FIG._5C
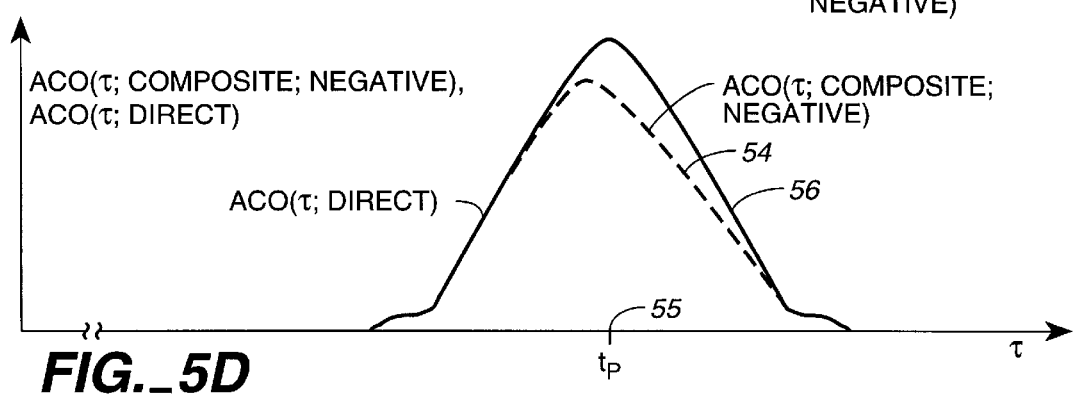
FIG._5D

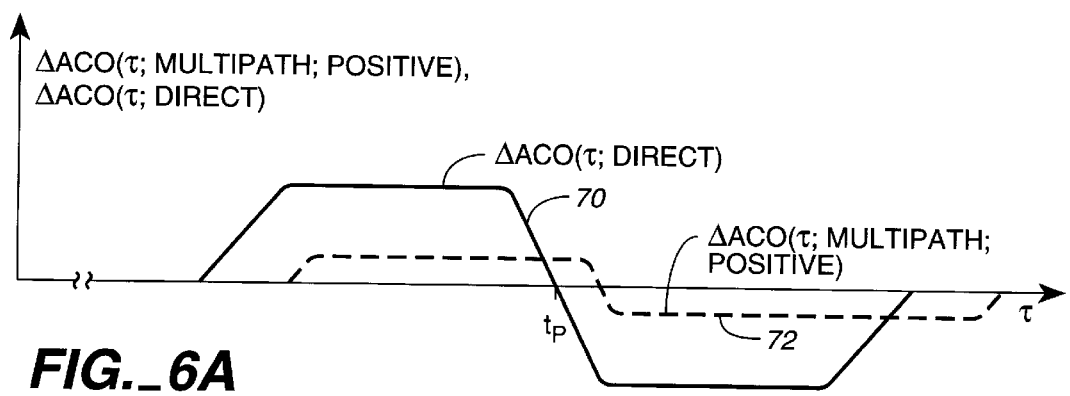
FIG._6A
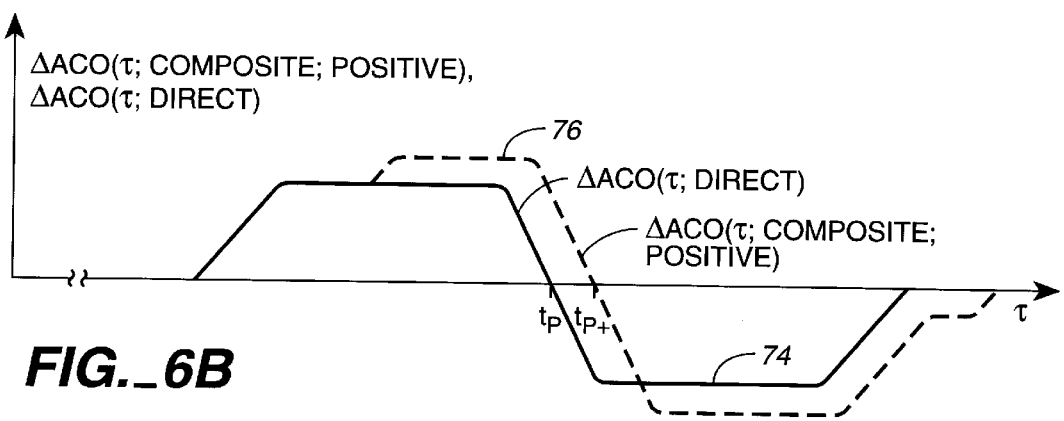
FIG._6B
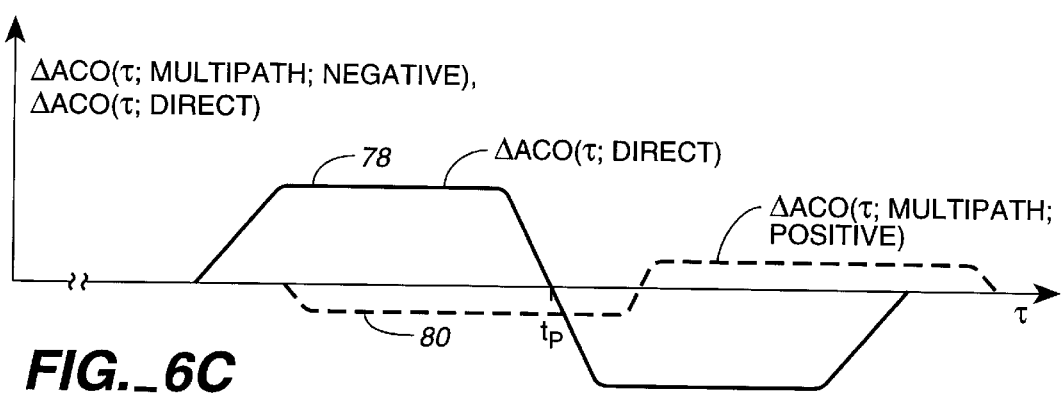
FIG._6C
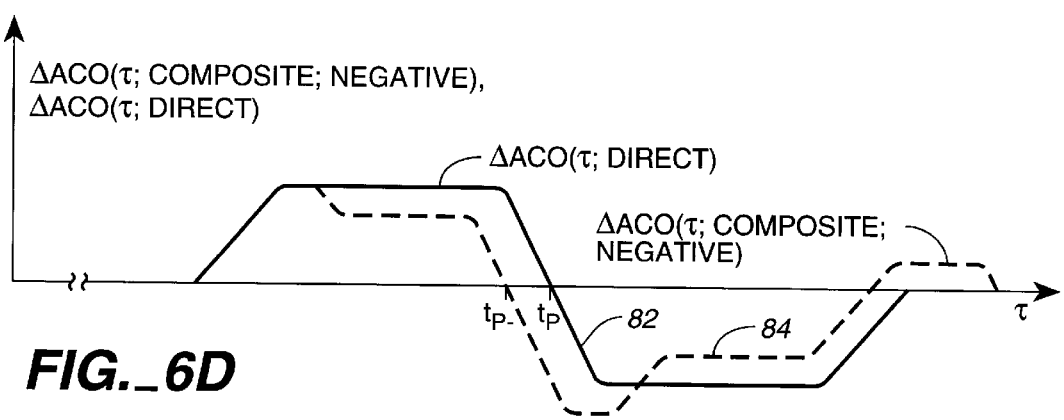
FIG._6D

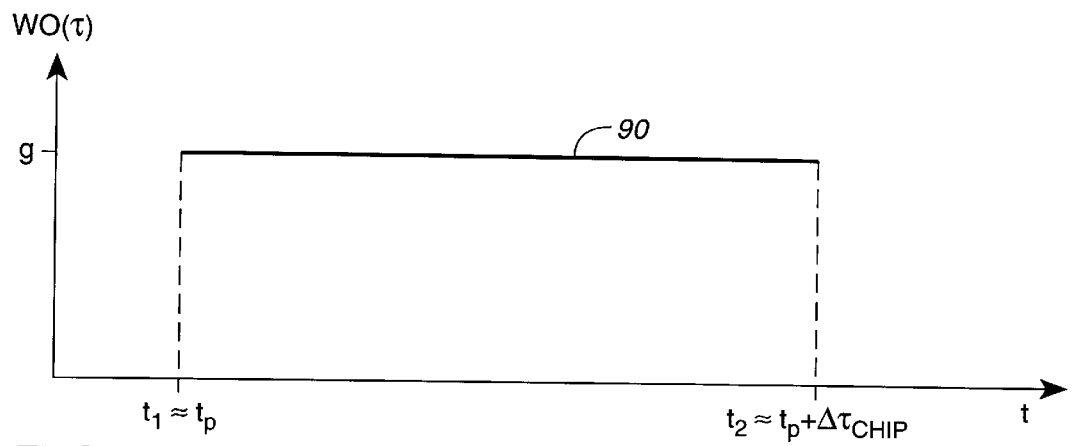
FIG._7A
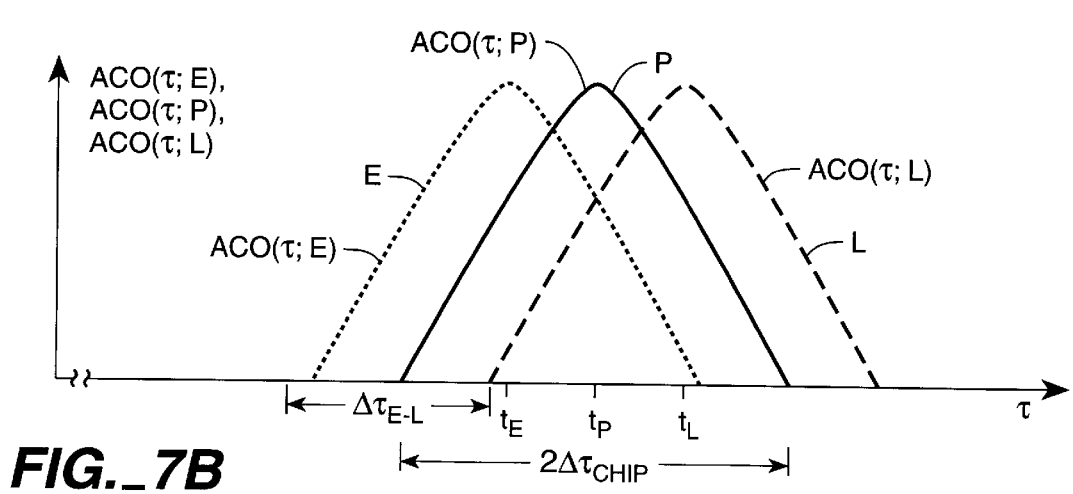
FIG._7B
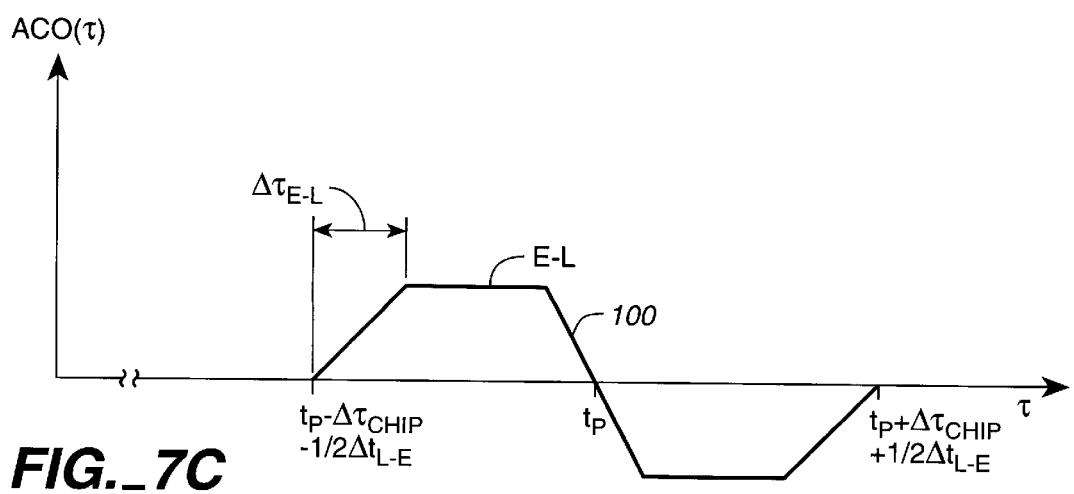
FIG._7C

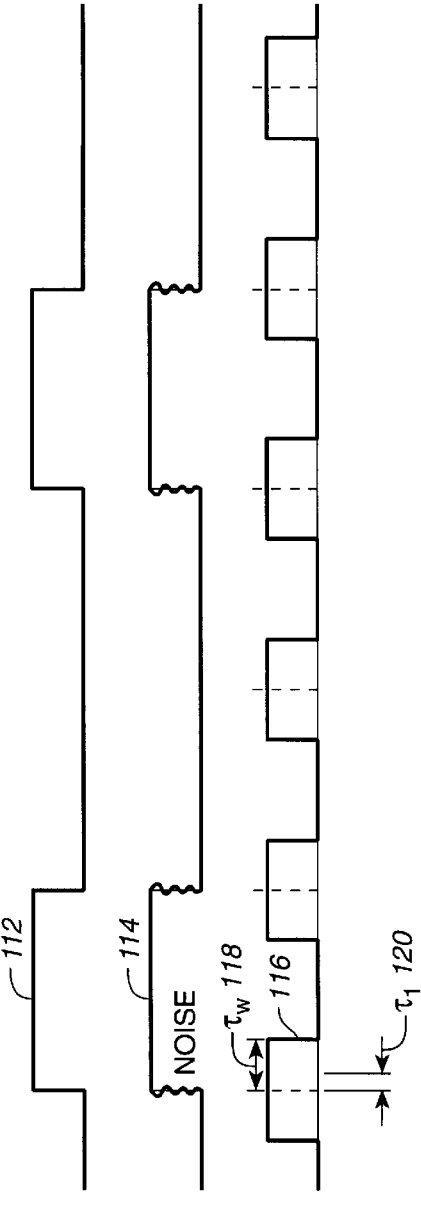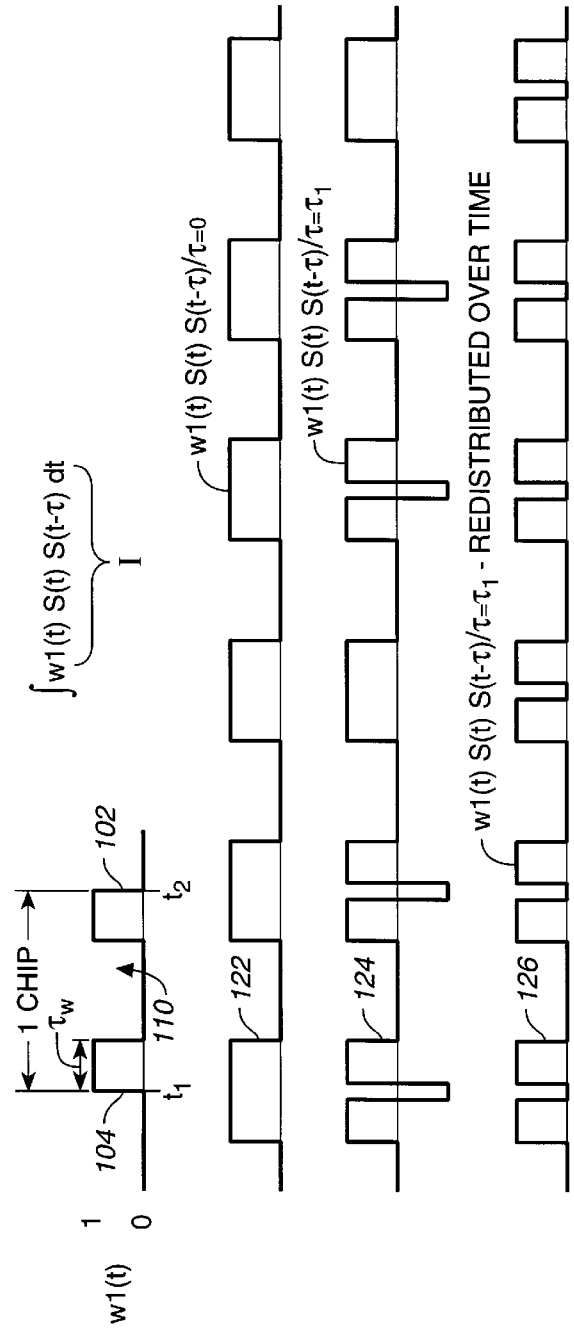

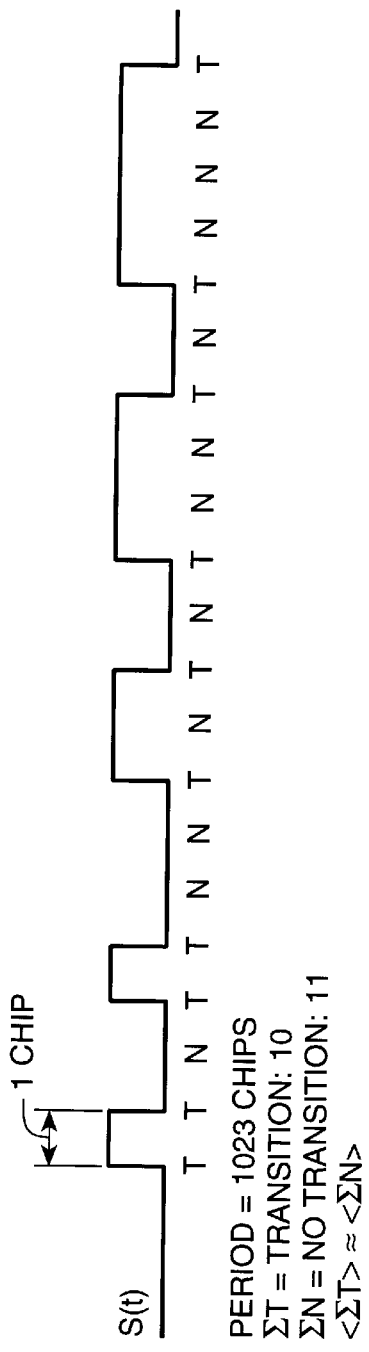
FIG._9
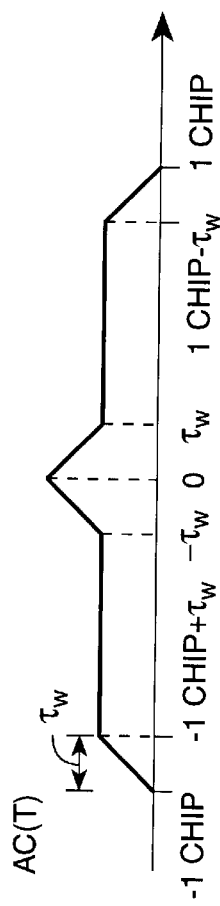
FIG._11A
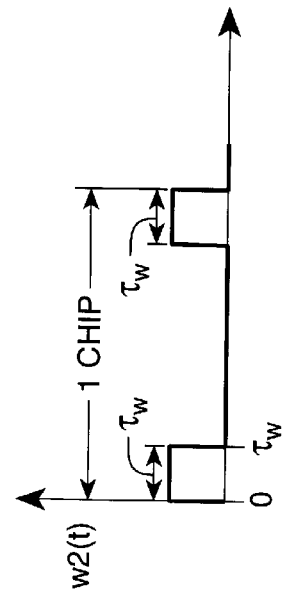
FIG._11B

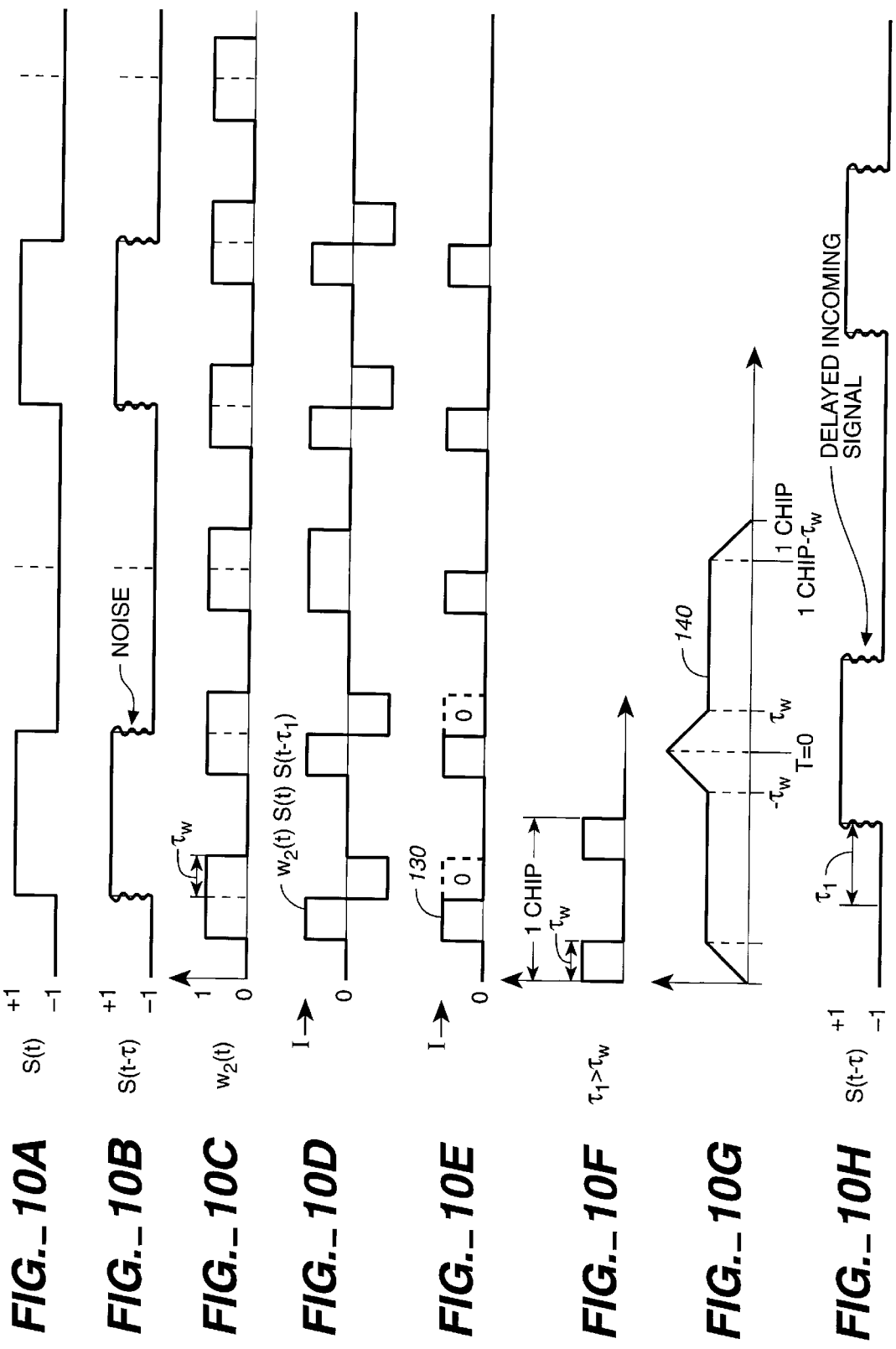

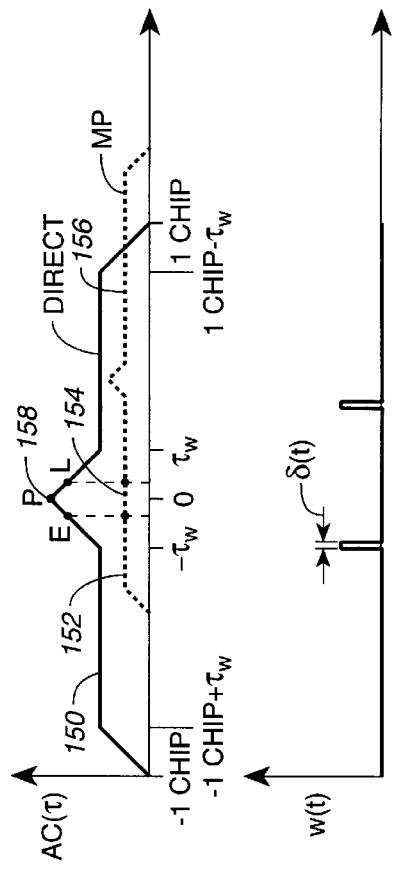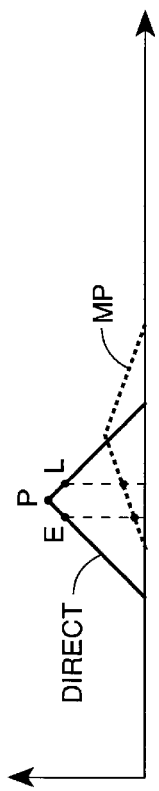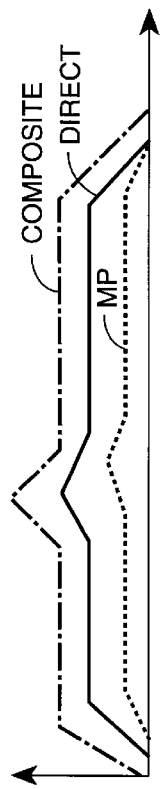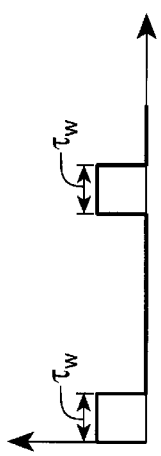
FIG._12A  FIG._12B  FIG._12C  FIG._12D  FIG._12E

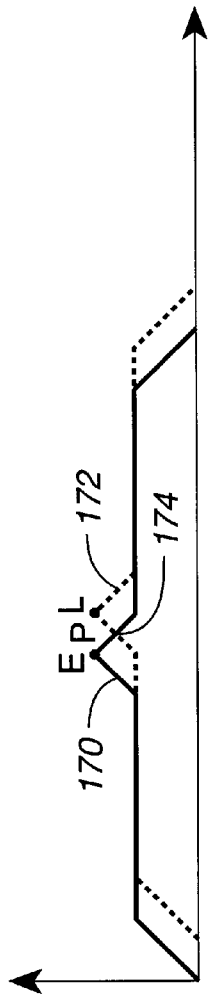
FIG._13A
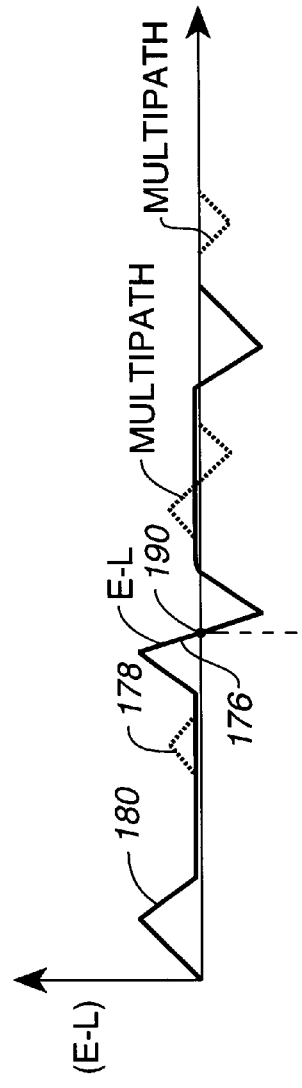
FIG._13B
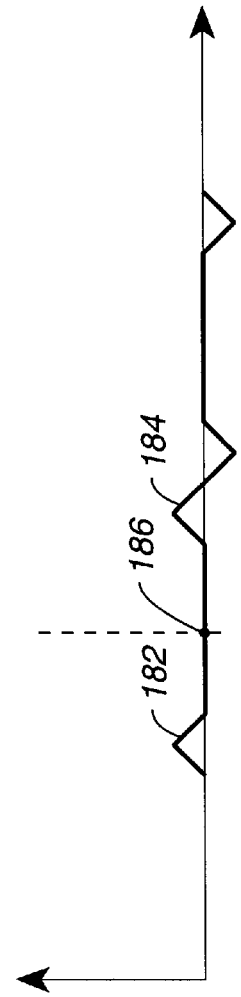
FIG._13C

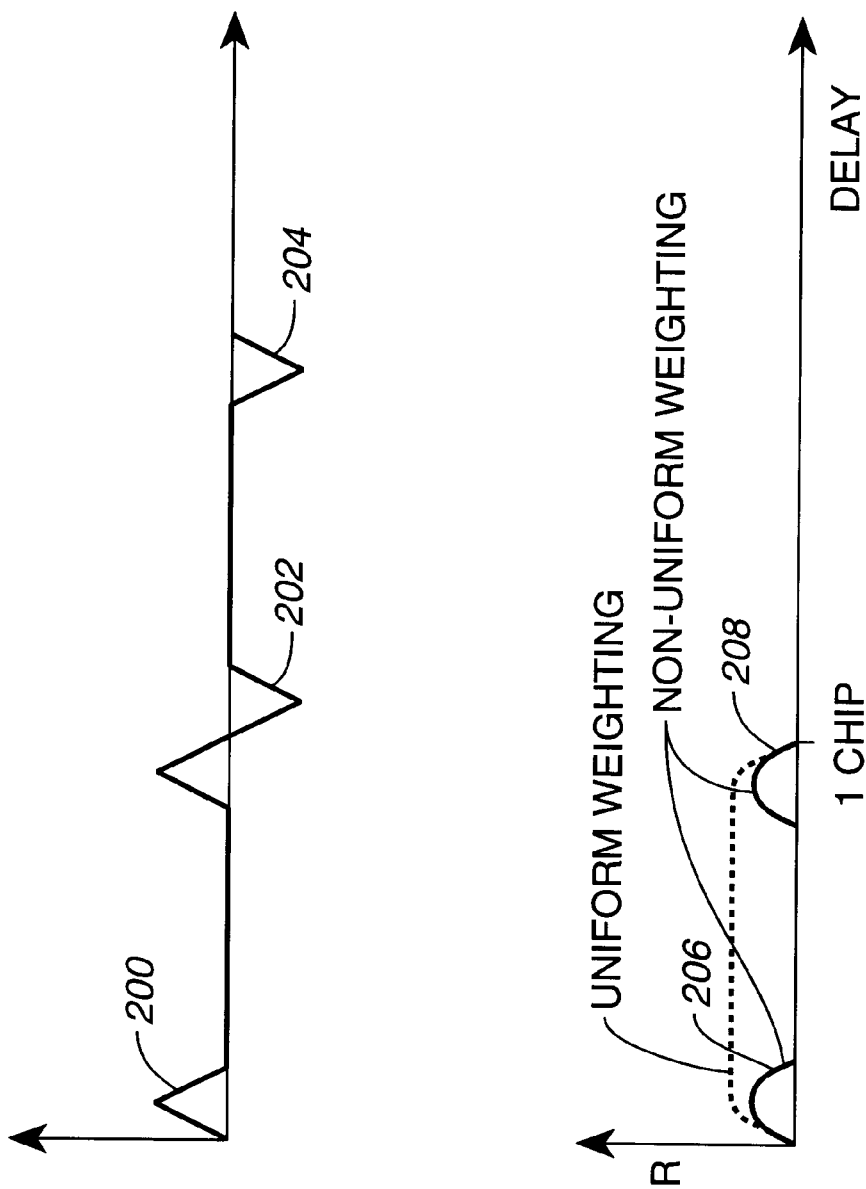
FIG._14A
FIG._14B

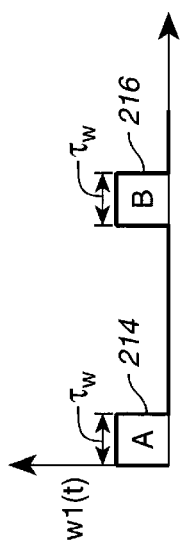
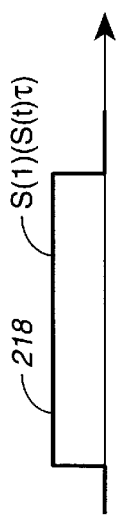
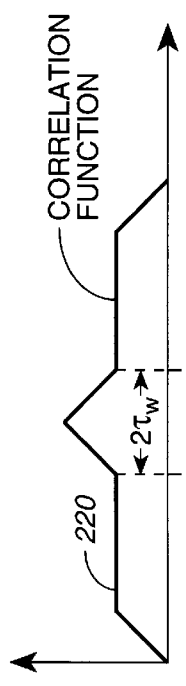
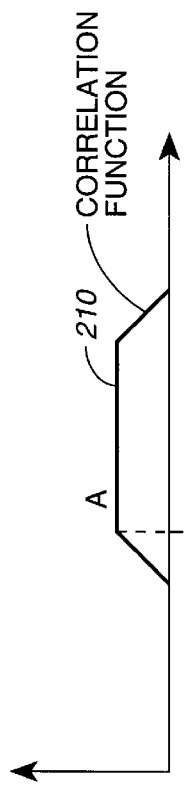
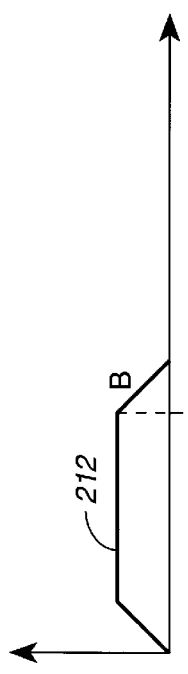
FIG._15A  FIG._15B  FIG._15C  FIG._16A  FIG._16B

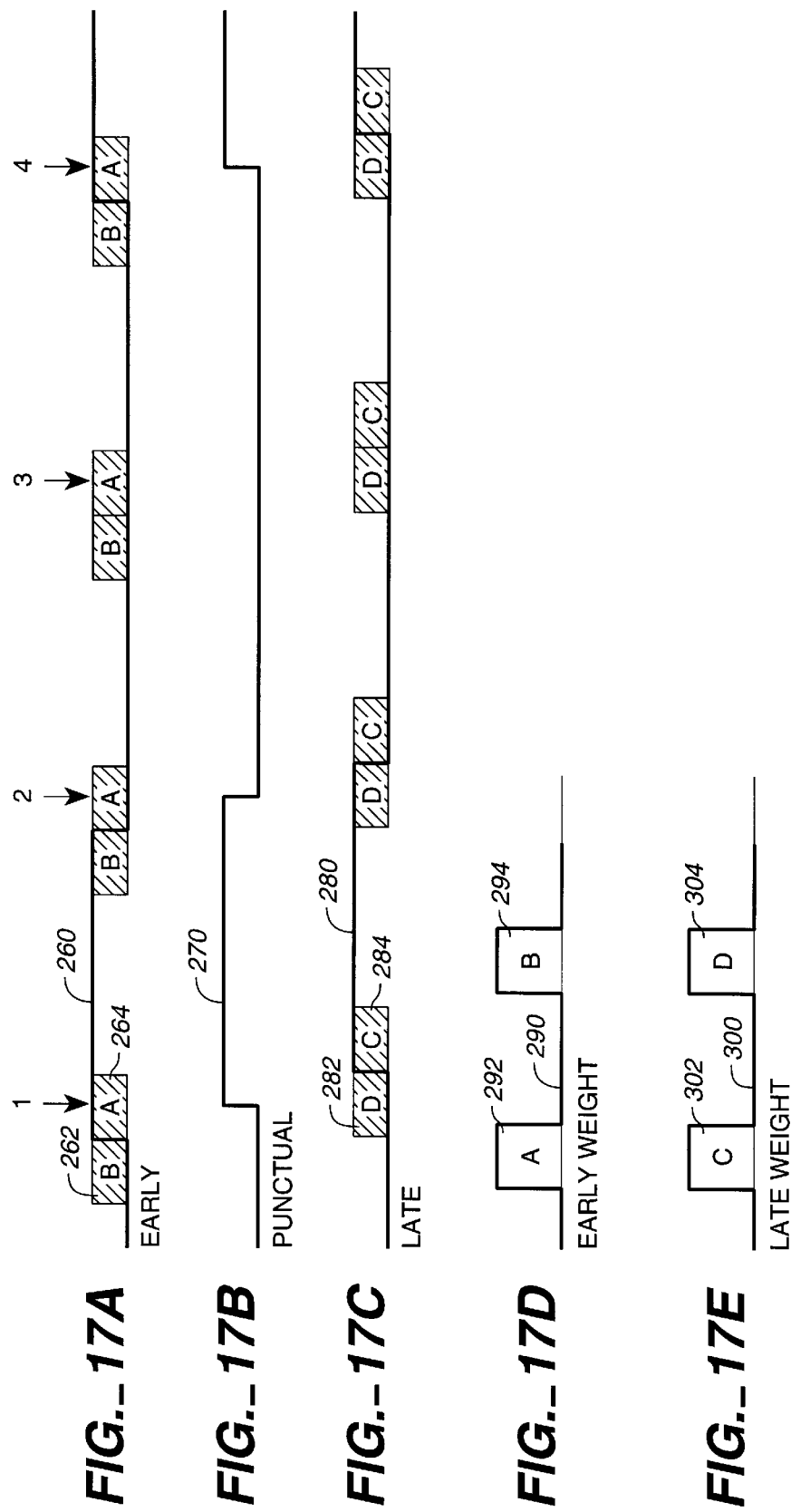

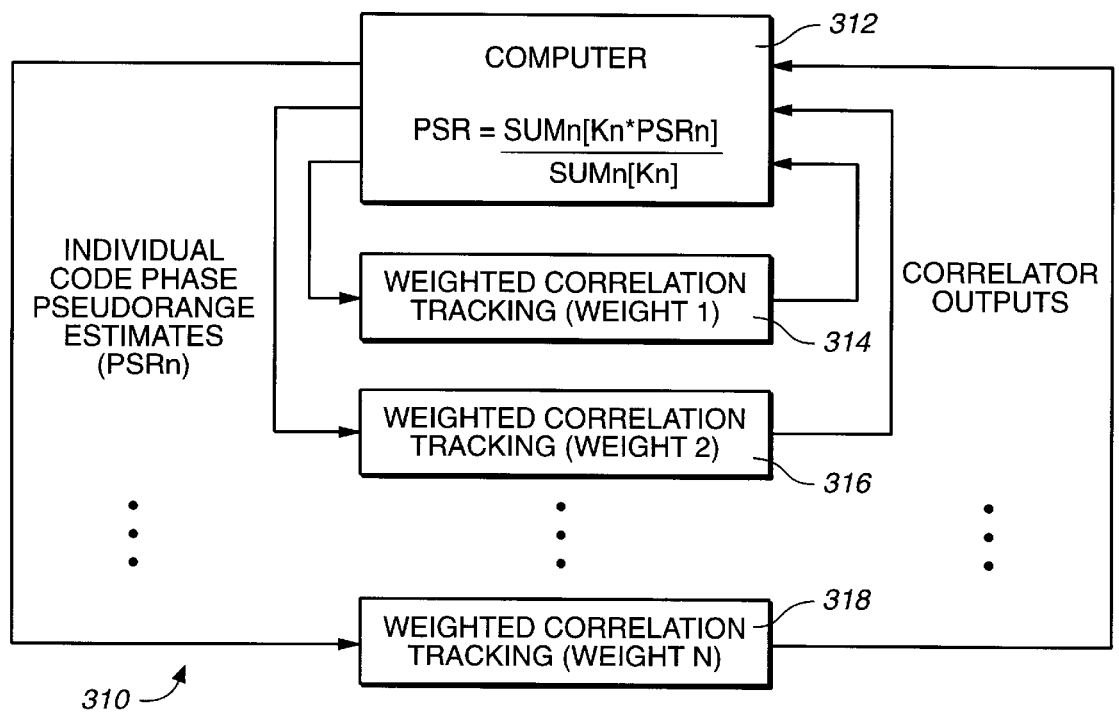
FIG._18
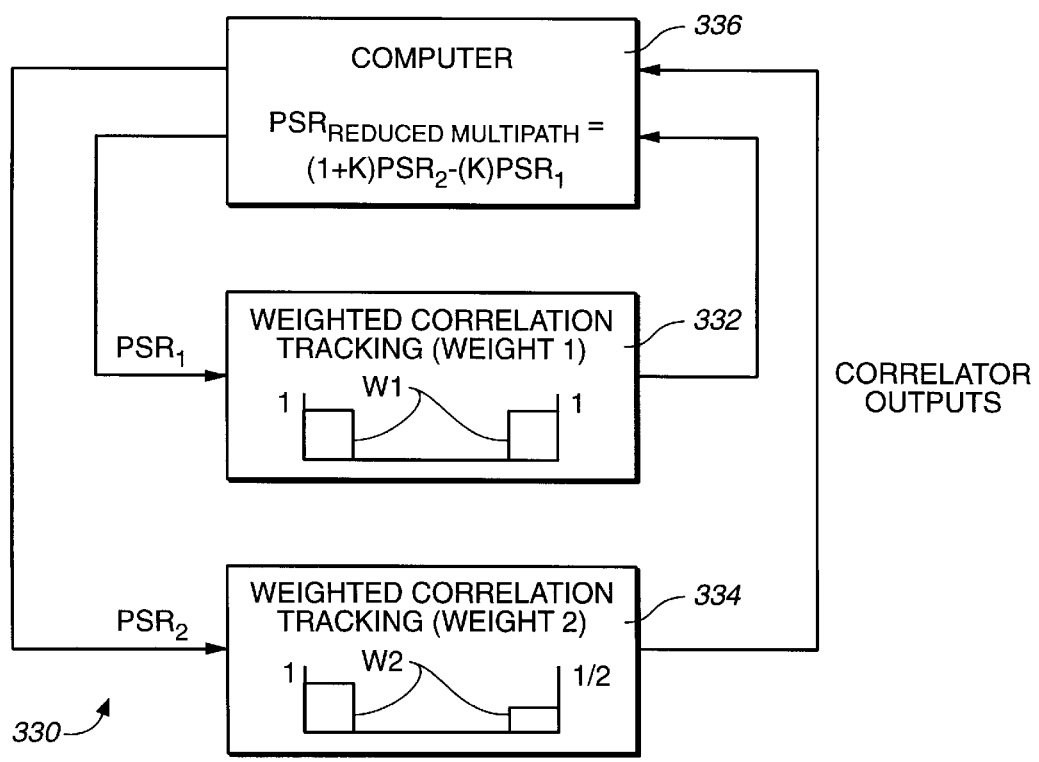
FIG._19

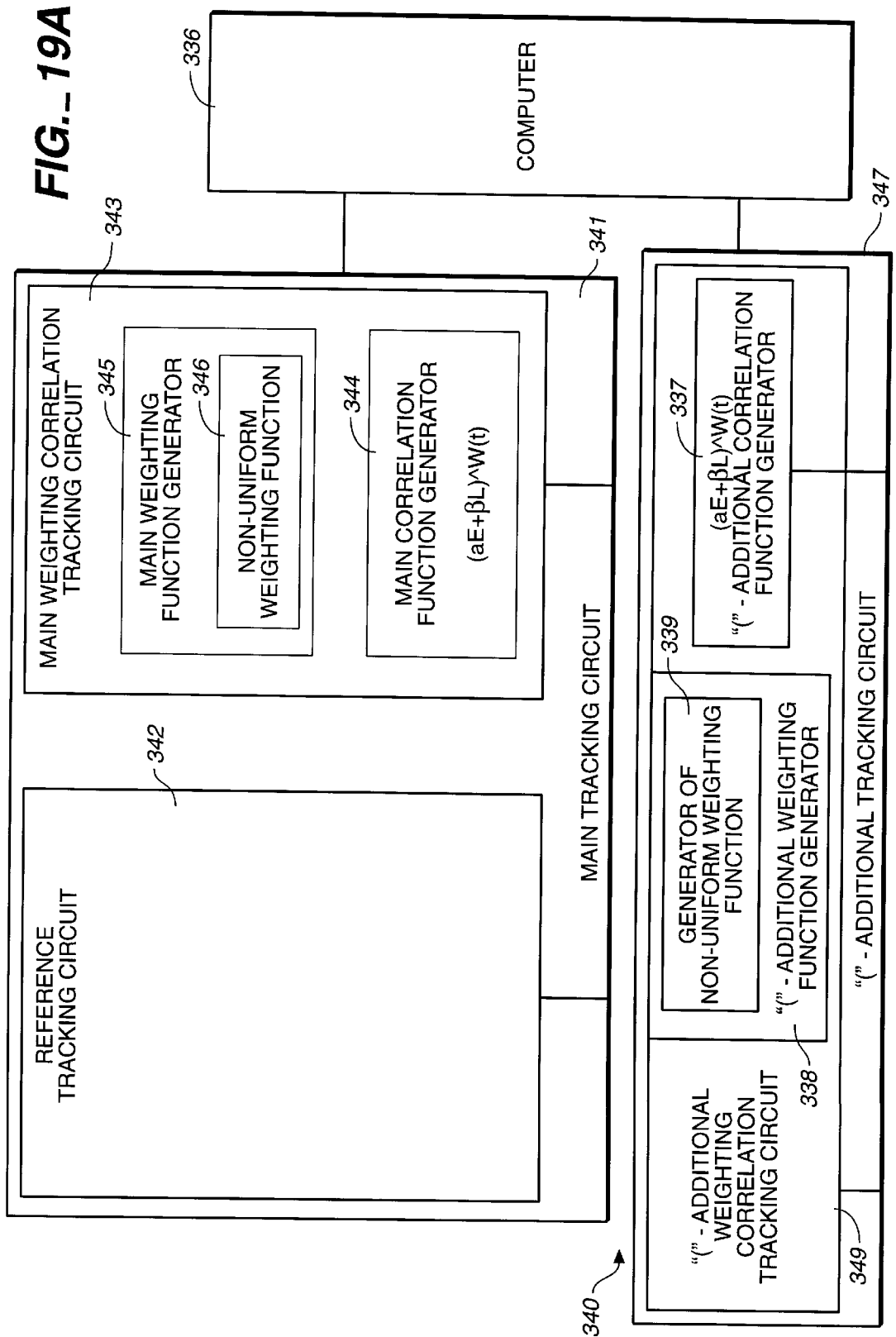
FIG._19A

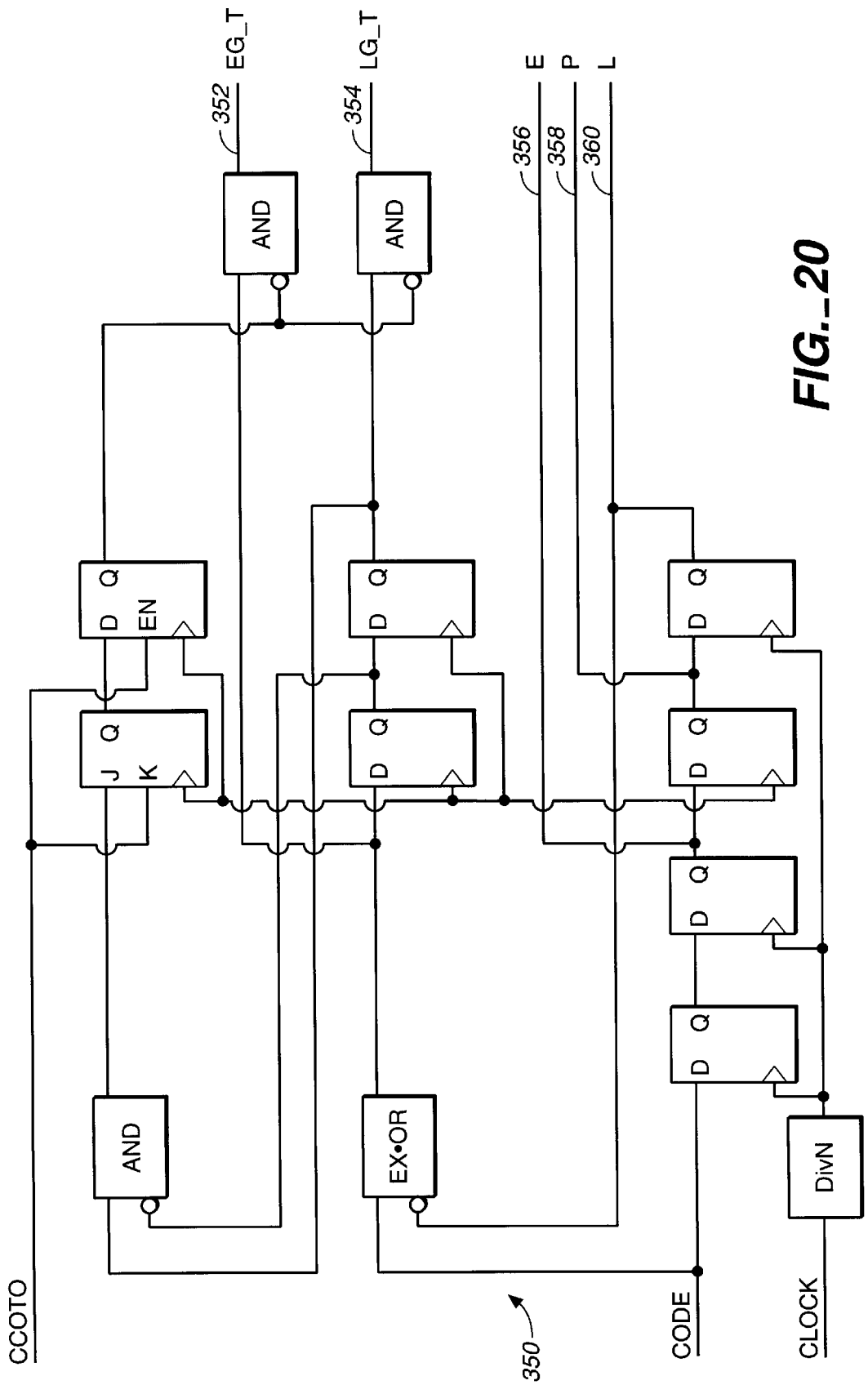
FIG._20

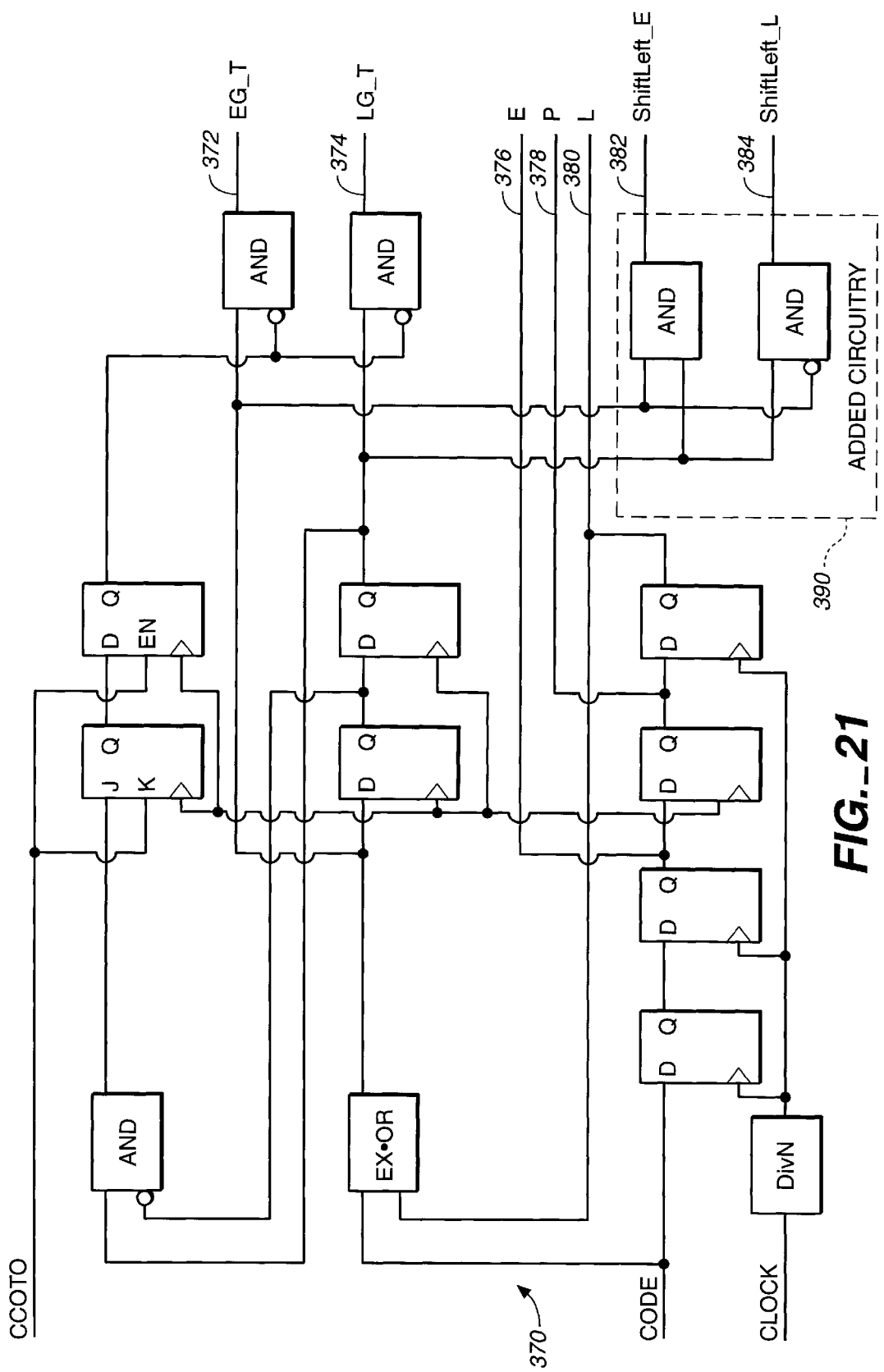
FIG._21

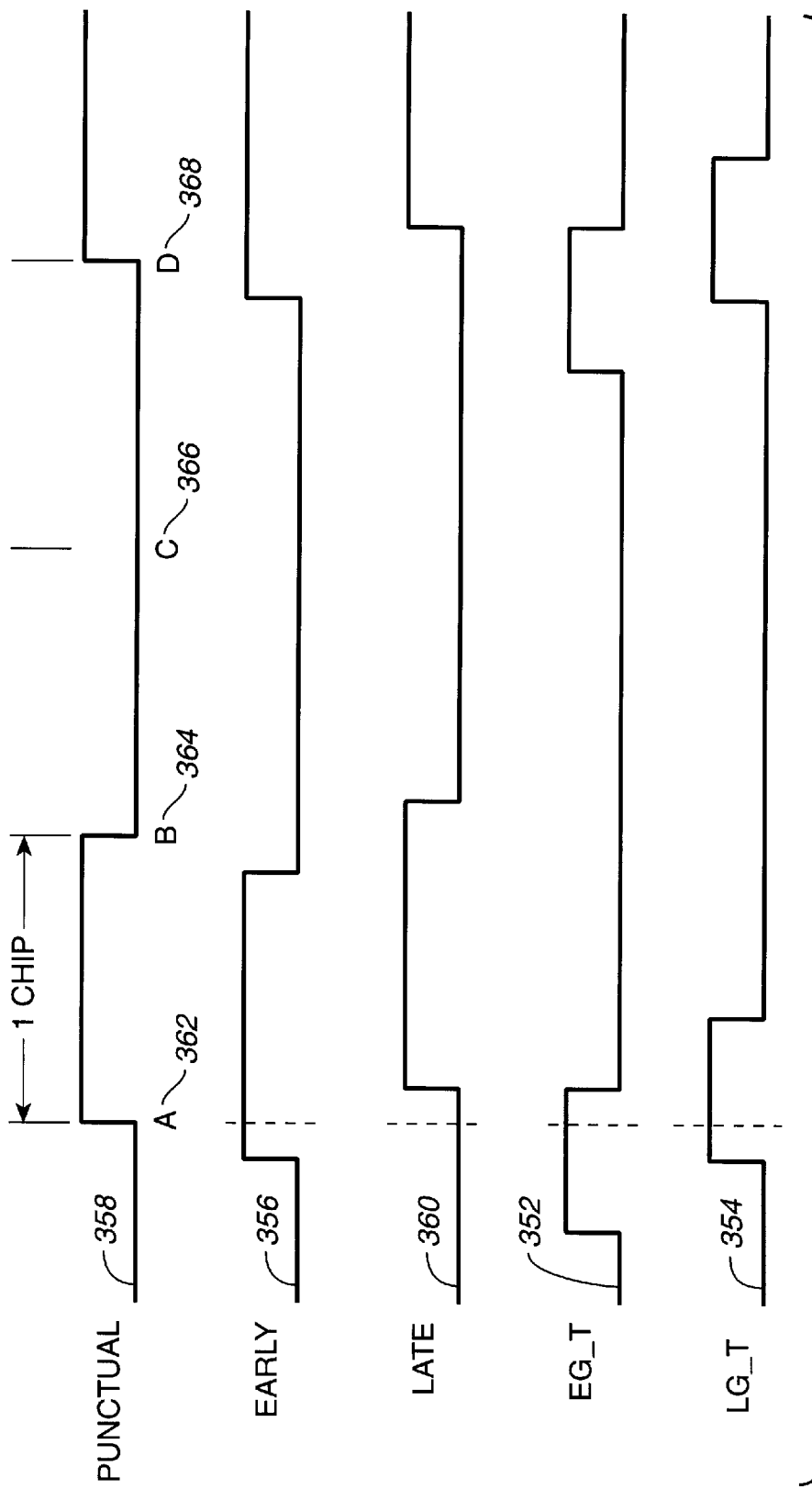
FIG._22

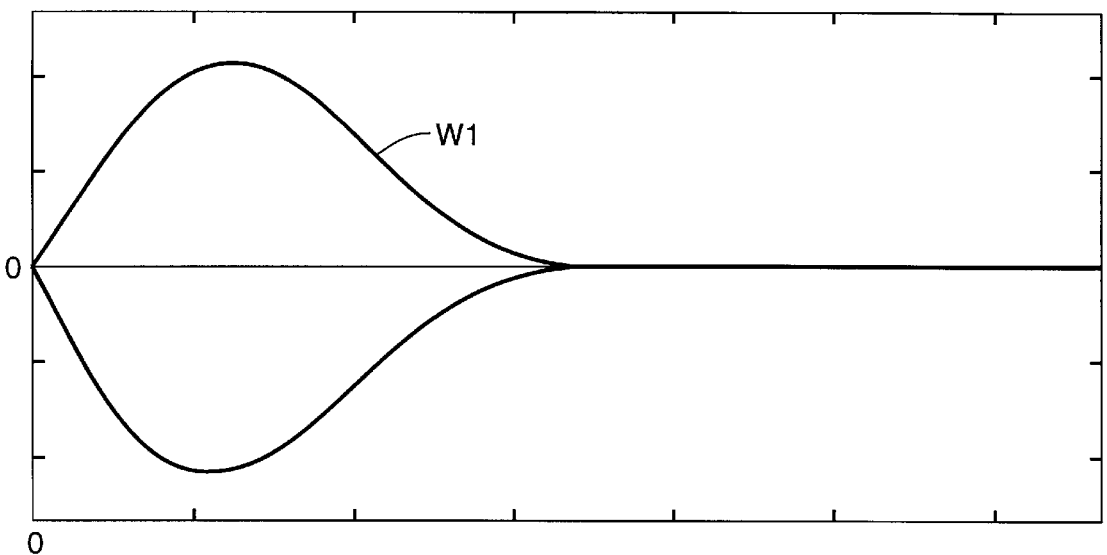
FIG._23A
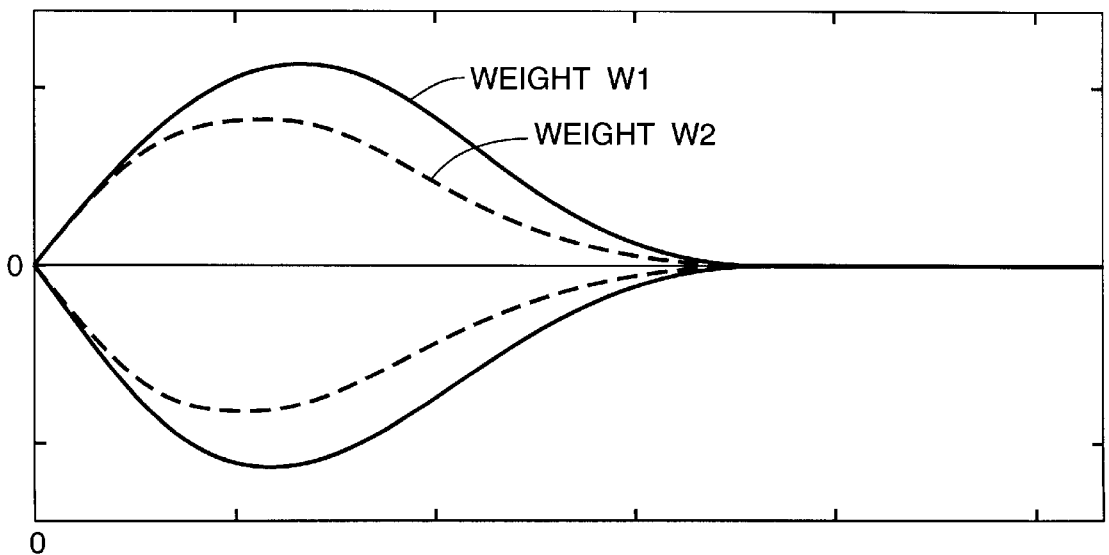
FIG._23B

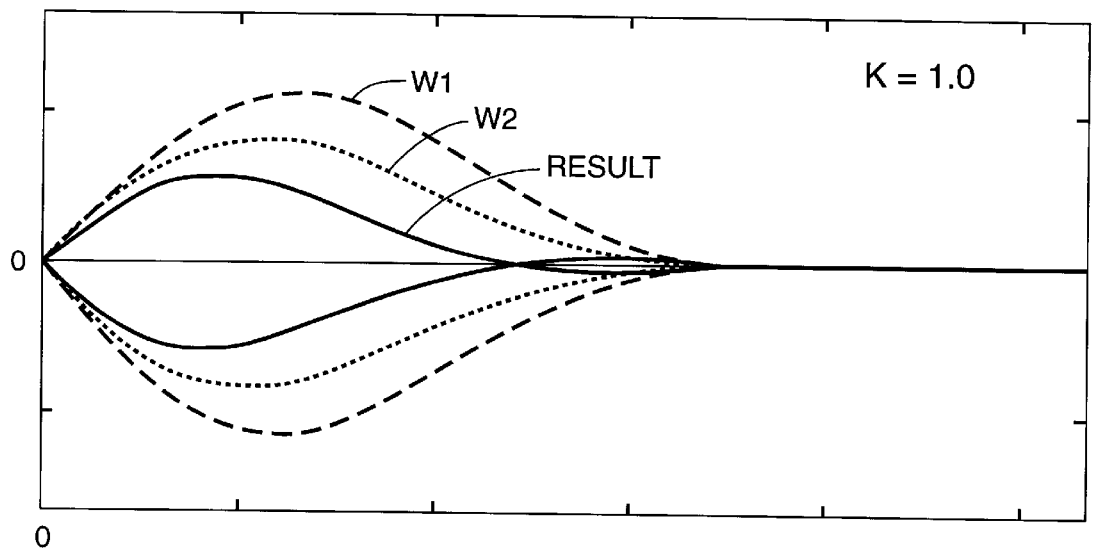
FIG._24
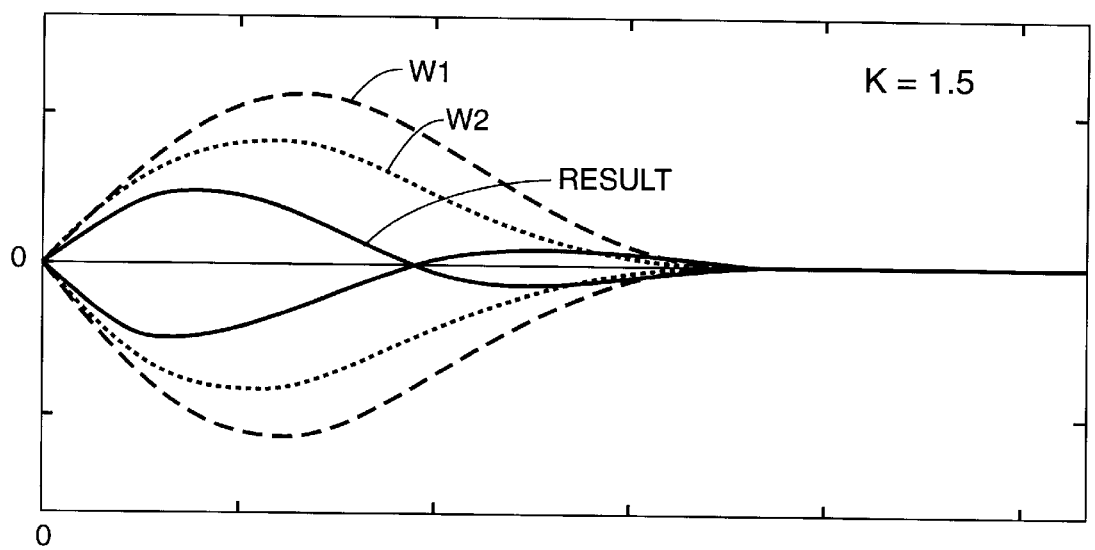
FIG._25

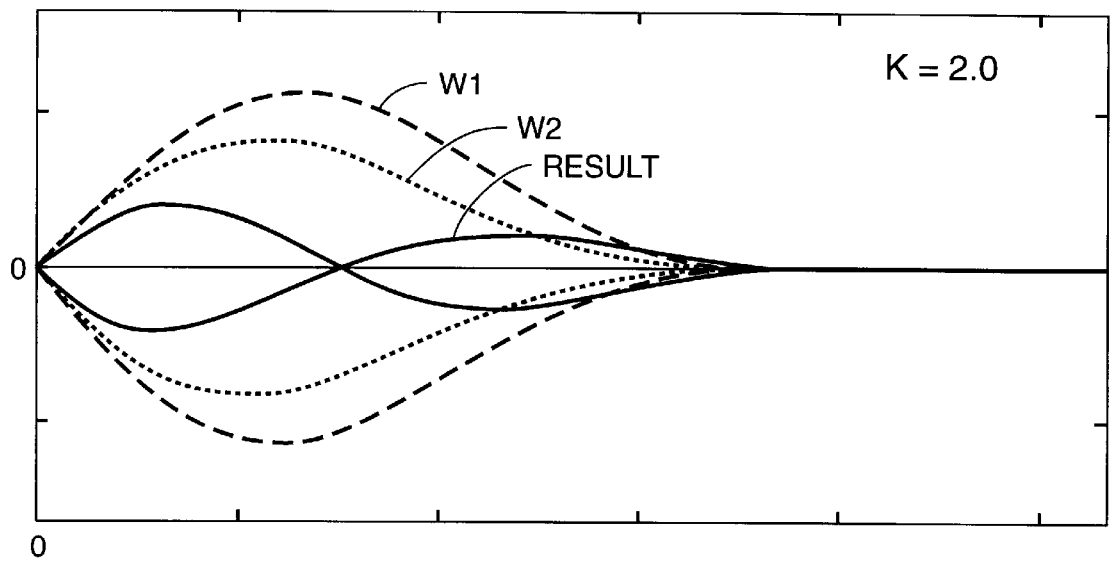
FIG._26
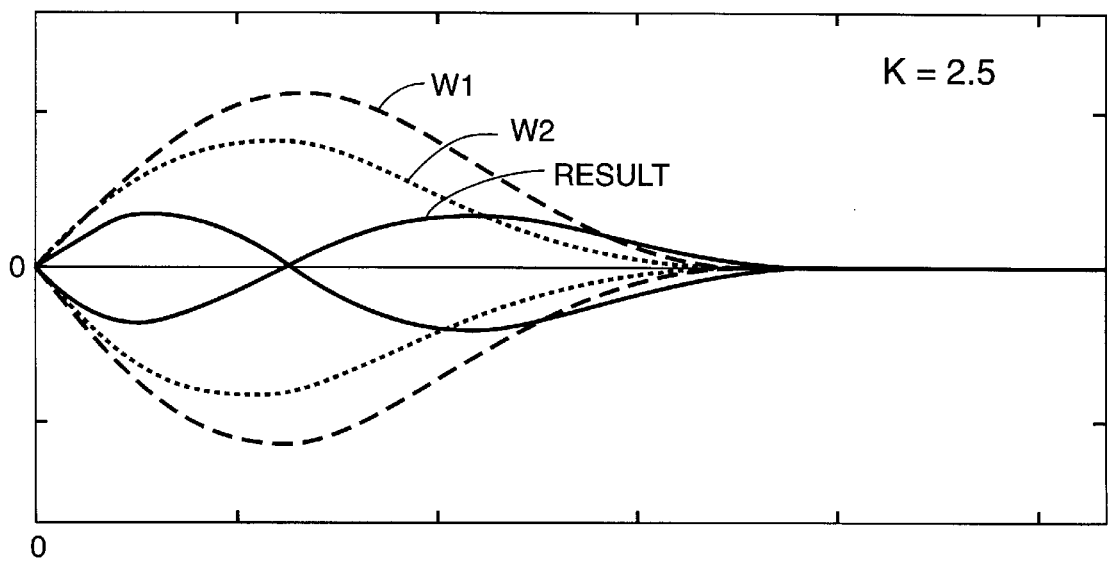
FIG._27

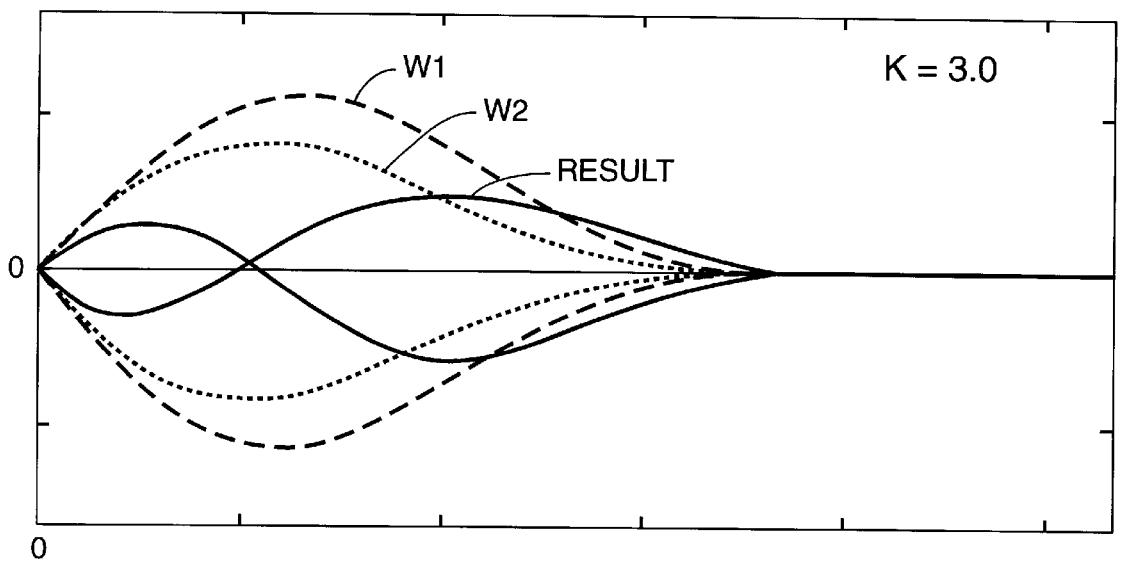
FIG._28
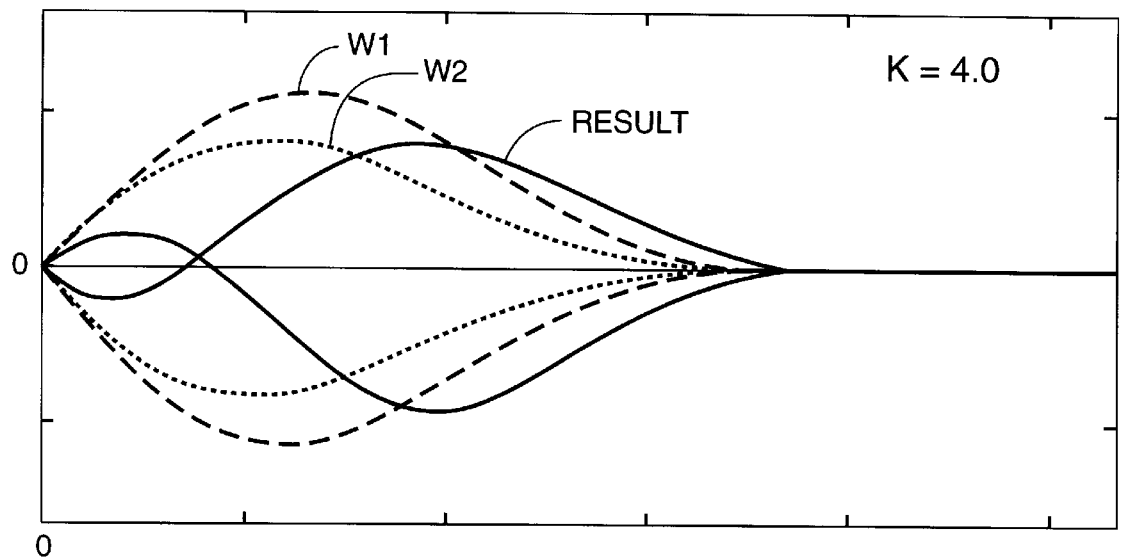
FIG._29

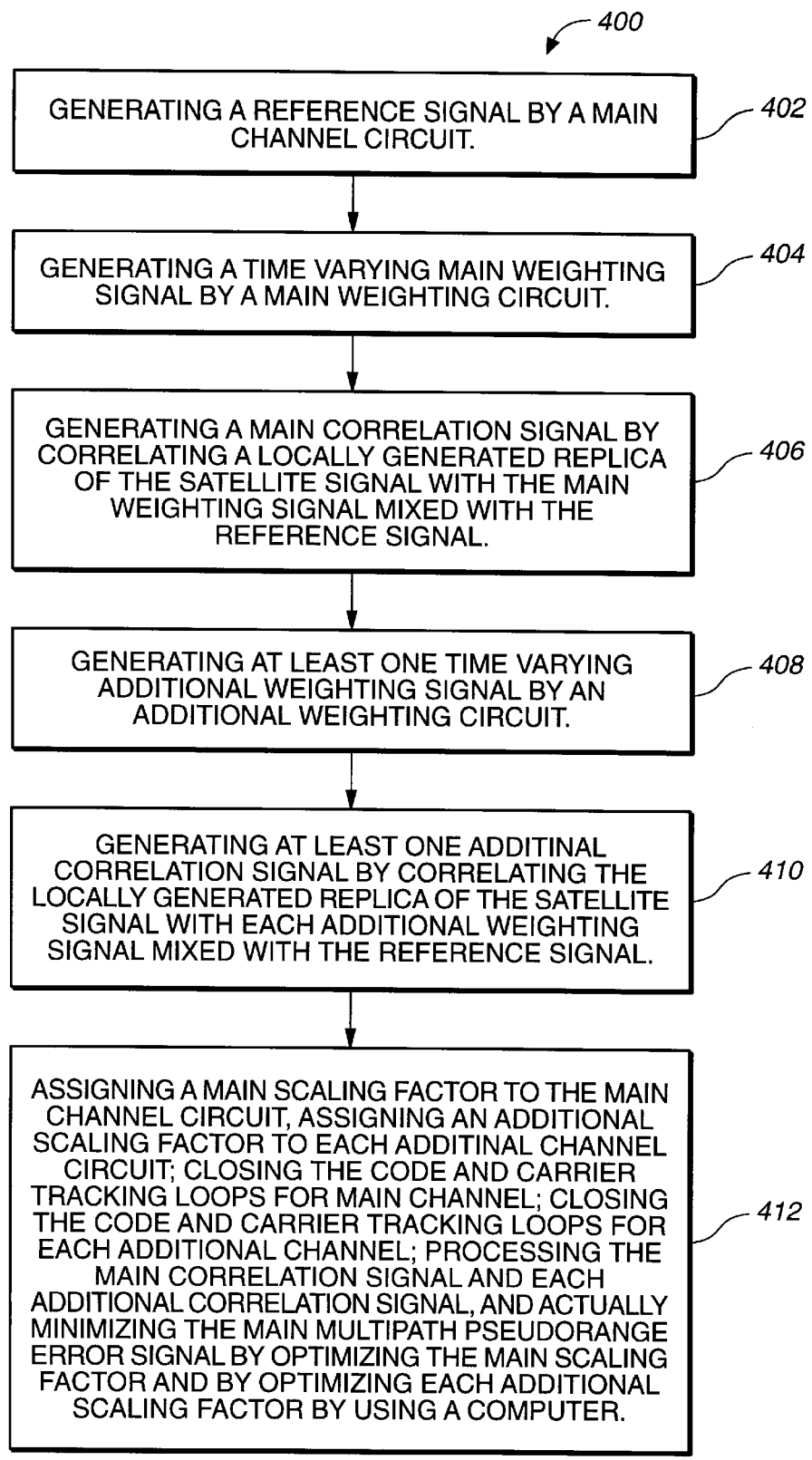
FIG._30

CODE MULTIPATH REDUCTION USING WEIGHTED CORRELATION CHANNELS

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on Dec. 8, 1993, when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies L1=1575.42 MHz and L2=1227.6 MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On Jan. 31, 1994 the SA was finally implemented. The purpose of SA is to make the P-codes available only to authorized and military users. Users must be equipped with a decryption device or the "key" in order to lock on to P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3).

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability.

The multipath errors originate with contamination of SATPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for code multipath reduction are required.

One such technique for code multipath reduction was disclosed by Rayman Pon in the U.S. Pat. No. 5,704,965 entitled "Suppression Of Multipath Signal Effects", that was assigned to the assignee of the present patent application, and that was filed on May 20, 1996. This patent application is specifically referred to in the present patent application and is incorporated herein by reference.

Another example of such technique for code multipath reduction was disclosed by Rayman Pon, Kreg Martin, and Dominic Farmer in the U.S. Pat. application Ser. No. 08/650, 338 entitled "Variable Suppression Of Multipath Signal Effects", that was also assigned to the assignee of the present patent application, also filed on May 20, 1996. This patent application is specifically referred to in the present patent application and is also incorporated herein by reference.

In both above referenced patent applications the code multipath reduction was based on the utilization of the weighting and correlation means that changed the magnitude and shape of the composite signal autocorrelation function to suppress the contributions of a multipath signal. However, although the multipath signal is suppressed, the residual multipath component signal is still present in the composite signal.

What is needed is the technique that allows to minimize the effect of the residual multipath signal on the composite autocorrelation signal.

SUMMARY OF THE INVENTION

The present invention is unique because it provides an apparatus and a method that allows to minimize the effect of the residual multipath signal on the composite autocorrelation signal.

One aspect of the present invention is directed to an apparatus for use in decoding a composite signal (CD) including a satellite signal from a satellite and including a multipath distortion component. The apparatus comprises: (A) a main tracking satellite channel circuit for tracking the composite signal from the satellite, wherein the composite signal is received; and wherein the main channel circuit processes the composite signal and generates a main satellite pseudorange estimate signal and a main multipath pseudo-range error signal; (B) at least one additional tracking satellite channel for tracking the composite signal from the satellite, wherein the composite signal is received, and wherein each additional channel circuit processes the composite signal and generates an additional satellite pseudorange estimate signal and an additional multipath pseudorange error signal; and (C) a computer circuit for assigning a main scaling function to the main channel circuit; for assigning an additional scaling function for each additional channel circuit; for processing the scaled main satellite pseudorange estimate signal, the scaled main multipath pseudorange error signal, each scaled additional satellite pseudorange estimate signal, and each scaled additional multipath pseudorange error signal; and for minimizing the main multipath pseudorange error signal by optimizing the main scaling function and each additional scaling function.

In the preferred embodiment, the main tracking satellite channel circuit further comprises: (1) a reference tracking circuit for downconverting the composite signal and for generating a reference signal; and (2) a main weighting correlation tracking circuit.

In the preferred embodiment, the main weighting correlation tracking circuit further comprises: (1) a main weighting function generator for generating a main weighting signal, wherein the main weighting signal is multiplied by the reference signal; and (2) a main correlation function generator for generating a main correlation signal by correlating the reference signal multiplied by the main weighting function with a locally generated replica of a satellite signal, wherein the main correlation signal includes the main multipath pseudorange error signal.

In one embodiment, the main correlation function generator further includes: a linear combination of an Early (E^) and Late (L^) correlators for generating a correlation waveform (aE+bL)^W(t), "a" and "b" being real numbers, wherein the W(t) is an arbitrary weighting function; and wherein the information taken from the linear combination (aE+bL)^W(t) of the Early (E^) autocorrelation function and the Late (L^) autocorrelation function is used to close the main code tracking loop and to determine the exact tracking point $t_p$.

In the preferred embodiment, the main correlation function generator includes the following linear combination of an Early (E^) and Late (L^) correlators for generating a correlation waveform (E−L)^W(t).

In the preferred embodiment, the main weighting function generator further includes a main enabling circuit for generating non-uniform weighting function W comprising an integer number 'n' of weighting values: $\{W_1^m; W_2^m; \ldots W_n^m\}$.

In one embodiment, each additional tracking satellite channel circuit further comprises an additional weighting correlation tracking circuit. Each additional weighting correlation tracking circuit comprises: (1) an additional weighting function generator for generating an additional weighting signal, wherein the additional weighting signal is multiplied by the reference signal; and (2) an additional correlation function generator for generating an additional correlation signal including an additional multipath pseudorange error signal.

Each 'i' additional correlation function generator further comprises a linear combination of an Early (E^) and Late (L^) correlators for generating a correlation waveform ($a_i$E+$b_i$L)^W(t), "$a_i$" and "$b_i$" being real numbers, 'i' being an integer less or equal to the number of additional channels. W(t) is an arbitrary weighting function. The information taken from the linear combination ($a_i$E+$b_i$L)^W(t) of the Early (E^) autocorrelation function and the Late (L^) autocorrelation function is used to close each additional code tracking loop.

In the preferred embodiment, each additional weighting function generator further includes an additional enabling circuit for generating non-uniform weighting function W comprising an integer number 'k' of weighting values $\{W_1^a; W_2^a; \ldots W_k^a\}$.

One more aspect of the present invention is directed to a method for decoding a composite signal including a satellite signal and a multipath distortion component. The method comprises the steps of: (1) generating a reference signal by a main channel circuit; (2) generating a time varying main weighting signal by a main weighting circuit; (3) generating a main correlation signal by correlating a locally generated replica of the satellite signal with the main weighting signal mixed with the reference signal; wherein the main correlation signal includes a main multipath pseudorange error signal; (4) generating at least one time varying additional weighting signal by an additional weighting circuit, wherein the additional weighting signal is mixed with the reference signal; (5) generating at least one additional correlation signal by correlating the locally generated replica of the satellite signal with each additional weighting signal mixed with the reference signal; wherein each additional correlation signal includes an additional multipath pseudorange error signal; (6) assigning a main scaling function to the main channel circuit; (7) assigning an additional scaling function to each additional channel circuit; (8) closing the code and carrier tracking loops for main channel; (9) closing the code and carrier tracking loops for each additional channel; (10) processing the main correlation signal and each additional correlation signal; and (11) actually minimizing the main multipath pseudorange error signal by optimizing the main scaling function and by optimizing each additional scaling function using a computer.

BRIEF DESCRIPTION OF THE DRAWINGS

FIG. 1A is a plot of a uniform weighting function.

FIG. 1B is a plot of an autocorrelation function.

FIG. 1C illustrates a satellite signal.

FIG. 1D shows a locally generated replica of an incoming satellite signal.

FIG. 1E is a depiction of a satellite signal multiplied by a locally generated replica of a satellite signal.

FIG. 2A shows a satellite signal S(t).

FIG. 2B is an illustration of a time shifted replica of a satellite signal S(t−τ1).

FIG. 2C is a depiction of a function S(t)*S(t−τ1), wherein '*' denotes a multiplication operation.

FIG. 2D depicts a timing characteristic of a correlation function ∫S(t)*S(t−τ)dt.

FIG. 3A illustrates a uniform weighting function W(t).

FIG. 3B shows a function B(t).

FIG. 3C illustrates a function W(t)*B(t−τ).

FIG. 4A is a depiction of a Punctual correlation function of the direct satellite signal for uniform weighting.

FIG. 4B shows an Early and a Late correlation functions of the direct satellite signal for uniform weighting.

FIG. 4C is an illustration of an (Early minus Late) correlation function of the satellite signal for uniform weighting.

FIG. 5A depicts a direct correlation function and a positive multipath correlation function.

FIG. 5B illustrates a direct correlation function and a composite correlation function for a positive multipath.

FIG. 5C depicts a direct correlation function and a negative multipath correlation function.

FIG. 5D illustrates a direct correlation function and a composite correlation function for a negative multipath.

FIG. 6A shows an (Early minus Late) direct correlation function and an (Early minus Late) positive multipath correlation function.

FIG. 6B is an illustration of an (Early minus Late) direct correlation function and an (Early minus Late) composite correlation function with a positive multipath.

FIG. 6C shows an (Early minus Late) direct correlation function and an (Early minus Late) negative multipath correlation function.

FIG. 6D is an illustration of an (Early minus Late) direct correlation function and an (Early minus Late) composite correlation function with a negative multipath.

FIG. 7A shows a uniform weighting function.

FIG. 7B illustrates Punctual, Early, and Late direct correlation functions for uniform weighting function.

FIG. 7C is a depiction of an (Early minus Late) direct correlation function for uniform weighting function.

FIG. 8A shows a replica of an incoming satellite signal.

FIG. 8B illustrates an incoming satellite signal.

FIG. 8C depicts a non-uniform weighting function W1(t) with width $\tau_w$ within many chips.

FIG. 8D is a plot of a non-uniform weighting function W1(t) with width $\tau_w$ within one chip.

FIG. 8E shows function W1(t)*S(t)*S(t−$\tau$) for $\tau$=0.

FIG. 8F illustrates function W1(t)*S(t)*S(t−$\tau$) for small $\tau$<$\tau_w$.

FIG. 8G depicts function of FIG. 8F re-distributed over time.

FIG. 9 is an illustration of a pseudo-random sequence.

FIG. 10A shows a replica of an incoming satellite signal.

FIG. 10B illustrates an incoming satellite signal.

FIG. 10C depicts a non-uniform weighting function W2(t) with width $\tau_w$ within many chips.

FIG. 10D shows function W2(t)*S(t)*S(t−$\tau$) for large $\tau$>$\tau_w$.

FIG. 10E depicts function of FIG. 10D re-distributed over time.

FIG. 10F is a plot of a non-uniform weighting function W2(t) with width $\tau_w$ within one chip.

FIG. 10G illustrates direct correlation function for a non-uniform weighting function.

FIG. 10H illustrates a delayed incoming satellite signal.

FIG. 11A illustrates a detailed structure of a direct correlation function for a non-uniform weighting function W2(t) with width $\tau_w$.

FIG. 11B depicts a detailed structure of a non-uniform weighting function W2(t) with width $\tau_w$.

FIG. 12A illustrates a direct correlation function for a non-uniform weighting function with width $\tau_w$ and a multipath correlation function for a non-uniform weighting function with width $\tau_w$.

FIG. 12B depicts the $\delta$(t)-function type non-uniform weighting function with width $\tau_w$=$\delta$→0.

FIG. 12C illustrates a direct correlation function and a multipath correlation function for uniform weighting.

FIG. 12D shows direct and multipath correlation functions for non-uniform weighting function of FIG. 12E.

FIG. 12E is a depiction of a non-uniform weighting function with width $\tau_w$.

FIG. 13A shows an Early and Late direct correlation functions for a non-uniform weighting function.

FIG. 13B illustrates (Early minus Late) direct and composite correlation functions for a non-uniform weighting function.

FIG. 13C depicts an (Early minus Late) multipath correlation function for a non-uniform weighting function.

FIG. 14A shows (Early minus Late) direct correlation functions for a non-uniform weighting function.

FIG. 14B illustrates multipath induced tracking error for uniform and non-uniform weighting functions.

FIG. 15A depicts non-uniform weighting function comprising two parts A and B.

FIG. 15B illustrates function S(t)*S(t−$\tau$).

FIG. 15C shows a correlation function for a non-uniform weighting function of FIG. 15A.

FIG. 16A depicts a correlation function for part A of non-uniform weighting function of FIG. 15A.

FIG. 16B shows a correlation function for part B of non-uniform weighting function of FIG. 15A.

FIG. 17A shows an Early pseudorandom sequence of replica signal for a non-uniform weighting function of FIG. 17D.

FIG. 17B depicts a Punctual pseudorandom sequence of a replica signal.

FIG. 17C is an illustration of a Late pseudorandom sequence of replica signal for a non-uniform weighting function of FIG. 17E.

FIG. 17D shows a non-uniform weighting function comprising part A and part B.

FIG. 17E illustrates a non-uniform weighting function including parts C and D.

FIG. 18 shows a general high level architecture for an apparatus for mitigation of the residual multipath error signal.

FIG. 19 illustrates a generic architecture of an apparatus for multipath mitigation using combinations of weighted correlation channels.

FIG. 19A shows the main tracking circuit including a main correlation function generator and one of additional tracking circuits including an additional correlation function generator.

FIG. 20 depicts the enabling circuit of the main channel of the apparatus of FIG. 19.

FIG. 21 illustrates the enabling circuit of the additional channel of the apparatus of FIG. 19.

FIG. 22 depicts Punctual, Early, and Late pseudorandom sequences of replica signal used for generating EG_T and LG_T signals of FIG. 21.

FIG. 23A shows multipath pseudorange error signal for the main channel.

FIG. 23B shows multipath pseudorange error signals for the main channel and for the additional channel.

FIG. 24 illustrates the computer simulation of the apparatus of the present invention resulting in the decrease of the multipath main error pseudorange signal due to using of two channels (the main one and the additional one) with weighting functions W1 and W2 and with the scaling factor K=1.

FIG. 25 shows the computer simulation of the apparatus of the present invention resulting in the decrease of the multipath main error pseudorange signal due to using of two channels (the main one and the additional one) with weighting functions W1 and W2 and with the scaling factor K=1.5.

FIG. 26 depicts the computer simulation of the apparatus of the present invention resulting in the decrease of the multipath main error pseudorange signal due to using of two channels (the main one and the additional one) with weighting functions W1 and W2 and with the scaling factor K=2.

FIG. 27 shows the computer simulation of the apparatus of the present invention resulting in the decrease of the multipath main error pseudorange signal due to using of two channels (the main one and the additional one) with weighting functions W1 and W2 and with the scaling factor K=2.5.

FIG. 28 illustrates the computer simulation of the apparatus of the present invention resulting in the decrease of the multipath main error pseudorange signal due to using of two channels (the main one and the additional one) with weighting functions W1 and W2 and with the scaling factor K=3.

FIG. 29 depicts the computer simulation of the apparatus of the present invention resulting in the decrease of the multipath main error pseudorange signal due to using of two channels (the main one and the additional one) with weighting functions W1 and W2 and with the scaling factor K=4.

FIG. 30 is a flow chart of the method of the present invention.

FULL DESCRIPTION OF THE PREFERRED EMBODIMENT

The multipath pseudorange error signal is not completely eliminated after applying the techniques developed in the U.S. Patent applications entitled "Suppression of multipath signal effects" U.S. Pat. No. 5,704,965 (patent application #1) and "Variable suppression of multipath signal effects" application Ser. No. 08/650,338 (patent application #2) filed on May 20, 1996. These two patent applications are referred to in the present patent application and incorporated by reference herein.

In particular, the present invention can relate to the radio receivers of the satellite signals. Radio receivers for the SATPS navigation data bit stream are commonly referred to as correlation receivers. Correlation receivers are typically employed because they are designed for situations encountered in satellite broadcasting where the strength of the SATPS signal is quite weak compared to the noise level. In order to boost the weak signal without amplifying the noise, it is the practice to use spread spectrum modulation in SATPS satellite systems. The spread spectrum technique modulates the satellite transmission by the individual satellite identification code, and this has the effect of spreading the satellite signal over a bandwidth that is determined by the reciprocal of the pulse width. The receiver multiplies the signal received on the ground by a replica of the individual satellite code, and this kind of demodulation is generally known as correlation. Spread spectrum systems are fully described by M. Simon, J. Omura, R. Scholtz, and B. Levitt in the "Spread Spectrum Communications Handbook", McGraw-Hill, Inc., 1994.

A particular advantage of using spread spectrum modulation is that it allows the time of arrival of the transmitted signal to be determined by the receiver. The time-of-arrival measurement is used to calculate the pseudorange, which is the first estimate of the distance between the receiver and a SATPS satellite. The carrier tracking allows one to obtain the second and more precise estimate of the distance between the receiver and a SATPS satellite. Therefore, at first we discuss the correlation process between two codes: the incoming code and the locally-generated code.

Determining the time of arrival of a signal requires the recognition of at least a portion of the incoming signal and a comparison of the time of arrival of the incoming signal with the time that it was known to have been transmitted. This measurement is made by aligning the incoming code and the local code using a code tracking loop, and by multiplying the incoming satellite signal with the locally-generated replica of the spread spectrum code. To produce measurable signal power at the receiver, the incoming signal and the local replica are required to be aligned with each other within one cycle of the code clocking rate. This one cycle at the clocking rate is also referred to as "chip". If the two codes are within one chip of each other, some measurable signal power will be observed at the output of the receiver correlator, and the closer the two codes are aligned, the greater is the power that will be observed. The relationship of the delay time between the two codes to the amount of signal power observed at the output of the correlation operation is called the autocorrelation function (AF). It will be appreciated that peak received power will be detected when the two codes are perfectly aligned in time.

The ideal autocorrelation (10) between two spread spectrum codes (curve 12) is shown in FIG. 1B. The curve 12 is a result of integration of a satellite signal S(t) (16) comprising a pseudorandom sequence (FIG. 1C), multiplied by a shifted in time satellite signal S(t−τ) (18) (FIG. 1D), and multiplied by an uniform weighting function W(t) (14) (FIG. 1A).

The true correlation function between two spread spectrum signals (one such signal being a satellite signal, the other such signal being a generated by an apparatus replica signal) in a real receiver (see curve 30 in FIG. 4A) is different from the ideal curve 12 that has a sharp peak corresponding to an infinite bandwidth (BW→∞). The peak of the curve 30 is not sharp, and the leading and trailing slopes from the peak are not straight. This rounding of the ideal triangular shape is caused by the use of the finite-bandwidth filters in the receiver prior to correlation. The information used to close the code tracking loop and to determine the exact tracking point is taken from an early E autocorrelation function (see 32 in FIG. 4B) and Late L autocorrelation function (see 34 in FIG. 4B). This two correlation functions are used to generate an (Early minus Late) correlation function (40 of FIG. 4C). The (E−L) correlation function yields the tracking point $t_p$ (42).

One troublesome kind of interfering signal is known as multipath. Multipath refers to the phenomena in radio wave propagation wherein a receiver system is able to collect a so-called primary (direct) signal, representing the direct path of radio wave propagation between the source and the receiver, and also a plurality of secondary delayed versions of the direct signal, representing reflections of the direct signal from objects adjacent the direct path. This phenomena is particularly acute in receiver systems with large coverage-area antennas, such as commonly found in GPS systems. The magnitude of multipath error induced in GPS systems has been reported by J. M. Tranquilla et al., "GPS Multipath Field Observations at Land and Water Sites", Navigation Journal of the Institute of Navigation, Vol. 37, No. 4, 1990–91.

These secondary signals have been found to have several important characteristics in relation to the direct signal. For example, the secondary signals always have a delayed time-of-arrival compared to the direct signal, because the secondary signals travel a slightly longer path than the direct signal. Furthermore, the respective amplitudes of the secondary signals are nearly always less than that of the direct signal, because the reflections attenuate the direct signal. For correlation receivers using digital modulations, multipath code phase signals with delays greater than one chip are completely uncorrelated, and can be ignored.

The multipath signal distance, that is the differential path length variation from the direct signal path, varies over the wavelength of the code phase. As a result, the multipath code signal can either add (positive multipath) to the desired direct signal or subtract from it (negative multipath).

FIG. 5A illustrates a direct correlation function 58 and a positive multipath correlation function 60. FIG. 5C depicts a direct correlation function 62 and a negative multipath correlation function 64. FIG. 5B shows a composite correlation function 50 for a positive multipath, and FIG. 5D is a depiction of a composite correlation function 54 with a negative multipath. FIG. 5B for positive multipath (and FIG. 5D for negative multipath) shows that the multipath signals causes the composite correlation function to have a larger voltage level (smaller voltage level) at the true tracking time point $t_p$ 53 (55) than the direct correlation function.

The alternative language of the (E-L) correlation function (100 of FIG. 7C) for uniform weighting function (90 of FIG. 7A) is illustrated in FIGS. 6A–6D. The (E-L) direct correlation functions (70, 74, 78, and 82) are depicted together with the (E-L) multipath correlation functions (72 for positive multipath, and 80 for negative multipath), and with the (E-L) composite correlation functions (76 for positive multipath, and 84 for negative multipath).

Use of non-uniform weighting functions introduced in the patent applications #1 and #2 (see discussion above) was very successful in suppressing the multipath signals. The main ideas of the patent applications #1 and #2 are repeated here because they are important for understanding the current patent application.

FIG. 8D illustrates a non-uniform weighting function W1(t) (110) comprising two parts 102 and 104 having width $\tau_w$. The function F(t,τ) of the pseudorandom sequence S(t) with the non-uniform weighting W1(t), that is the function F(t,τ)=W1(t)*S(t)*S(t−τ), is illustrated in FIGS. 8A–8G for low τ<$\tau_w$. The effective re-distribution of the F(t,τ)-function over the time t is shown in FIGS. 8F and 8G.

The F(t,τ)-function is also re-distributed over the time t for large τ>$\tau_w$ (See FIGS. 10A–10E). Thus, the correlation function ∫F(t,τ)dt (140) can be built for all τ. The result is shown in FIG. 10G.

FIG. 12A illustrates the direct (150) and multipath (152) correlation functions for non-uniform weighting function W1(t) comprising two parts 102 and 104 of FIG. 8D. The important result is that in the large range (154) of the multipath delays the multipath signal has no effect at all on the direct (E-L) correlation signal because of the broad plateau in the graph of the multipath correlation function 156. There is no such plateau in the case of uniform weighting function as illustrated in FIG. 12C. Thus, in the case of non-uniform weighting there is an effect of the multipath on the direct signal only for very small delays (region 206 of FIG. 14B) and for very large delays (region 208 of FIG. 14B). The size of regions 206 and 208 of FIG. 14B is proportional to the width $\tau_w$ of the non-uniform weighting function. Therefore, the most beneficial non-uniform weighting function has the least width $\tau_w$ possible. It follows, that the optimum non-uniform weighting function is the δ(t)-function that has width $\tau_w$=δ→0 as shown in FIG. 12B.

FIG. 13A depicts an Early (170) and a Late (172) representation of the direct signal correlation function for the non-uniform weighting. FIG. 13B shows the (E-L) representation of the composite (176) and the multipath (178) correlation functions. As it is discussed above, the multipath has no effect on the tracking point 190 for the large range of multipath delays. Indeed, FIG. 13C shows that between area 182 and area 184 of the (E-L) multipath correlation function there is no effect on the tracking point 186. Thus, the application of the non-uniform weighting in the apparatus disclosed in the patent application #1 resulted in the suppression of the multipath signal in the wide range of the multipath delays.

The apparatus disclosed in the patent application #2 is used to eliminate the 208 area (see FIG. 14B) of the multipath delays. This can be done by choosing different non-uniform weighting functions while receiving different parts of the incoming satellite signals. The present invention is used to minimize the contribution of the area 206 (FIG. 14B) of the multipath delays that is still left after applying techniques from both patent applications #1 and #2.

The idea of the present invention is to eliminate the multipath pseudorange error signal in a certain range of multipath delays (0–1.5 $\tau_w$) shown as region (206) in FIG. 14B by using an apparatus (310) including a set of tracking channels (314), (316), and (318) and a computer (312) as depicted in FIG. 18. One of the tracking channels is a main weighted correlation tracking channel (314) that is part of the apparatus disclosed in the patent applications #1 and #2. The block 314 tracks the code and carrier satellite direct signals and suppresses the multipath signal. However, the residual multipath signal is still present and affects the tracking point. The additional weighted correlation tracking channels (316, . . . 318) are used to minimize the residual multipath error signal by using the generator of the specially constructed non-uniform weighting function and by using a scaled combination of tracking channel signals to yield the actual pseudorange resulting signal. The actual scaling operation and minimization of the residual multipath signal occurs in the computer block 312.

In one embodiment of the present invention (shown in FIG. 19) the apparatus 330 comprises a main channel (332), one additional channel (334), and a computer (336). The main tracking channel (332) yields a main pseudorange signal (wherein the pseudorange signal is a satellite signal that can be used to calculate the pseudorange) $PSR_m$:

$$PSR_m = PSR_0 + MP_m; \quad (1)$$

wherein $PSR_0$ is an ideal pseudorange without multipath error, and $MP_m$ is a main multipath error signal that is still present for small delays (206 of FIG. 14B) after the main tracking channel has utilized a non-uniform weighting function $W_m$ technique according to patent applications #1 and #2 for suppressing the multipath effect.

Similarly, the additional tracking channel (334) yields an additional pseudorange signal $PSR_a$:

$$PSR_a = PSR_0 + MP_a. \quad (2)$$

Here, $MP_a$ is an additional multipath error signal that is still present for small delays (206 of FIG. 14B) after the additional tracking channel has utilized a non-uniform weighting function $W_a$ technique for suppressing the multipath effect as was described above according to patent applications #1 and #2.

The computer block (336) performs a number of following operations. The computer assigns a main scaling factor $K_m$ to the main channel circuit (332) and assigns an additional scaling factor $K_a$ to the additional channel circuit (334). The computer (336) actually minimizes the residual main multipath pseudorange error signal $MP_m$ by optimizing the main scaling factor $K_m$ and by optimizing the additional scaling factor $K_a$. This optimization can be achieved by adjusting the K-factors in the following equation:

$$PSR_{output} = \{K_m*(PSR_0+MP_m(W_m))+K_a*(PSR_0+MP_a(W_a))\}/(K_m+K_a); \quad (3)$$

wherein the multipath error signal $MP_m$ is the unsuppressed multipath pseudorange error signal that is still present after employing the non-uniform weighting function $W_m$ in the main tracking channel, and wherein the multipath error signal $MP_a$ is he unsuppressed multipath pseudorange error signal after employing the non-uniform weighting function $W_a$ in the additional tracking channel. Thus, there are two set of variables that can be changed in order to achieve the minimization of function (3): the set of actual weighting functions $\{W_m; W_a\}$ and the set of scaling factors: $\{K_m; K_a\}$.

In general case of a plurality of additional channels, the equation (3) can be rewritten in the following way:

$$PSR_{output} = (K_m*(PSR_0+MP_m(W_m))+\Sigma_a K_a*(PSR_0+MP_a(W_a)))/(K_m+\Sigma_a K_a). \quad (4)$$

The specific implementations of various hardware (or software) circuits that can be used for purposes of the present invention were fully disclosed by Rayman Pon in the patent application Ser. No. 08/683,859 entitled "Code multipath error estimation using weighted correlations". This patent application is referred to in the present patent application as the patent application #3 and is incorporated by reference herein.

Thus, in the present patent application we only demonstrate in principle how the objectives of the present invention can be implemented in hardware (or software) circuits.

In the preferred embodiment, as depicted in FIG. 19A, the main tracking satellite channel circuit (341) further comprises a reference tracking circuit (342) for downconverting the composite signal including a satellite signal and a main multipath error signal, and for generating a reference signal; and a main weighting correlation tracking circuit (343).

The main weighting correlation tracking circuit (343) further comprises a main weighting function generator (345) for generating a main weighting signal and a main correlation function generator (344). The correlation function generator generates a main correlation signal by correlating the reference signal multiplied by the main weighting function with a locally generated replica of a satellite signal. The main correlation signal includes the main multipath pseudorange error signal.

In one embodiment, the main correlation function generator (344) further comprises a linear combination of an Early (E^) and Late (L^) correlators for generating a correlation waveform $(aE+bL)^{\wedge}W(t)$, wherein "a" and "b" are real numbers, and wherein $W(t)$ is an arbitrary weighting function. In the preferred embodiment, the main correlation function comprises a $(E-L)^{\wedge}W(t)$ correlation function, wherein the tracking pint is determined by cross-section of the Early and Late correlation functions.

In one embodiment, the main weighting function generator (345) further includes a main enabling circuit (346) for generating a non-uniform weighting function W comprising an integer number 'n' of weighting values: $\{W_1^m W_2^m \ldots W_n^m\}$. In the preferred embodiment, the main weighting function $W_m$ comprises the values: $\{1,0,1\}$.

Similarly, each additional tracking satellite channel circuit (347) comprises an additional weighting correlation tracking circuit (349). Each said additional weighting correlation tracking circuit (349) further includes an additional weighting function generator (338) for generating an additional weighting signal, and an additional correlation function generator (337) for generating an additional correlation signal by correlating the reference signal multiplied by the additional weighting function with a locally generated replica of a satellite signal. The additional correlation signal includes the additional multipath pseudorange error signal. Each additional correlation signal is used by the computer circuit (336) to minimize the main multipath pseudorange error signal, as was explained above.

In one embodiment, each 'i' additional correlation function generator (337) includes a linear combination of an Early (E^) and Late (L^) correlators for generating a correlation waveform $(a_i E+b_i L)^{\wedge}W(t)$. Here, "$a_i$" and "$b_i$" are real numbers, and 'i' is an integer less or equal to the number of additional channels. In the preferred embodiment, $(a_i E+b_i L)^{\wedge}W(t)=(E-L)^{\wedge}W(t)$, wherein $W(t)$ is an arbitrary weighting function.

In one embodiment, each additional weighting function generator further includes an additional enabling circuit (339) for generating a non-uniform weighting function W comprising an integer number 'k' of weighting values $\{W_1^a; W_2^a; \ldots W_k^a\}$. In the preferred embodiment, the additional weighting function $W_m$ comprises the values: $\{1,0,\frac{1}{2}\}$.

FIG. 20 depicts one embodiment of the enabling circuit (350) of main tracking channel (332) of FIG. 19. The Early tracking gate signal EG_T (352) and the Late tracking gate signal LG_T (354) are used to enable the Early and Late correlators, respectively, when they are at logic high to provide an effective weighting function $W_m$. The timing diagrams for a typical portion of a pseudorandom sequence are shown in FIG. 22. FIG. 22 is drawn according to the following algorithm introduced in the patent application #2: (1) there was no transition at the transition time preceding transition time A (362); (2) a transition occurs at time A (362), therefore the EG_T (352) and LG_T (354) are at a logic high to provide an effective weighting function $W_m$; (3) a transition occurs at time B (364), but a transition also occurred at the preceding time A, therefore the EG_T and LG_T signals are not at logic high about the transition time B; (4) no transition occurs at time C (366), therefore the EG_T and LG_T signals are not at logic high about this transition time; and (5) a transition occurs at time D (368), and no transition occurred at the preceding transition time, therefore the EG_T and LG_T ate at logic high to provide effective weighting function $W_m$.

FIG. 21 depicts an implementation of the enabling circuit 370 of an additional channel 334 of FIG. 19. The circuitry of the enabling circuit for the additional channel as shown in FIG. 21 is similar to circuitry of the enabling circuit for the main channel as depicted in FIG. 20. The added circuitry 390 is used to identify the region in the weighting function $W_a$ which has weight of 1 for the Early and Late weighting functions. At these regions, instead of simply summing the contribution of the current data to the correlators, one should shift the data left by 1 by using the Early Shift_Left_E signal 382 and the Late Shift_Left_L signal 384 before summing into the correlators. This operation is logically equivalent to multiplication by 2. The regions of weight ½ are summed straight into the correlators as usual. The net effect is a weight 2 on the left side of the $W_a$ weighting function and a weight of 1 on the right side, which can be divided by 2 in the computer after the entire correlation is completed and read back. These operations effectively produce the $W_a$ weighting function 334 of FIG. 19.

FIG. 23A shows the multipath pseudorange error signal for weighting function $W_m$ for the main channel. FIG. 23B shows the multipath pseudorange error signal for weighting functions $W_m$ for the main channel of FIG. 19 and the multipath pseudorange error signal for weighting function $W_a$ for the additional channel of FIG. 19. FIG. 24 illustrates the computer simulation of the apparatus of FIG. 19 of the present invention using the weighting functions $W_m$ and $W_a$. The resulting composite signal generated by the apparatus employing two channels includes a reduced multipath main error pseudorange signal as compared with the composite signal generated by the apparatus having only the main channel. The scaling factor K=1, which means that both channels main and additional make the same contribution. FIG. 25 shows the computer simulation of the apparatus of the present invention similar to the apparatus of FIG. 24 but with the scaling factor K=1.5, that is the main channel makes 1.5 times less contribution than the additional channel. From the comparison of FIGS. 24 and 25 it is clear that the multipath error signal is reduced in the region of small delays but is shifted to the region of longer delays. FIG. 26 depicts the computer simulation for the scaling factor K=2. Both effects of reduced amplitude in the area of small delays and shift into the area of longer delays are amplified. FIG. 29 depicts the computer simulation for the scaling factor K=4. It results in the smallest multipath error in the area of short delays, but it has the significant multipath error signal in the area of longer delays. Therefore, the preferred embodiment of the present invention has the scaling factor K somewhere in between K=1 and K=4.

The present invention also includes a method for decoding a composite signal (CS) that includes a distortion component. The method, as depicted in FIG. 30, comprises the following steps: (408) generating a reference signal by a main channel circuit; (404) generating a time varying main weighting signal by a main weighting circuit; wherein the main weighting signal is mixed with the reference signal; (406) generating a main correlation signal by correlating a locally generated replica of the satellite signal with the main weighting signal mixed with the reference signal; wherein the main correlation signal includes a main multipath pseudorange error signal; (408) generating at least one time varying additional weighting signal by an additional weighting circuit, wherein the additional weighting signal is mixed with the reference signal; (410) generating at least one additional correlation signal by correlating the locally generated replica of the satellite signal with each additional weighting signal mixed with the reference signal; wherein the additional correlation signal includes an additional multipath pseudorange error signal; and (412) assigning a main scaling factor to the main channel circuit, assigning an additional scaling factor to each additional channel circuit; closing the code and carrier tracking loops for main channel; closing the code and carrier tracking loops for each additional channel; processing the main correlation signal and each additional correlation signal, and actually minimizing the main multipath pseudorange error signal by optimizing the main scaling factor and by optimizing each additional scaling factor by using a computer.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal (CD) including a satellite signal from a satellite and including a multipath distortion component, said apparatus comprising:

a main tracking satellite channel circuit for tracking said composite signal from said satellite, wherein said main channel circuit processes said composite signal and generates a main satellite pseudorange estimate signal and a main multipath pseudorange error signal; and wherein said main tracking satellite channel circuit further comprises;

a reference tracking circuit for downconverting said composite signal and for generating a reference signal; and a main weighting correlation tracking circuit for generating a main weighting correlation signal; wherein said main weighting correlation tracking circuit further comprises:

a main weighting function generator for generating a main weighting signal, wherein said main weighting signal is multiplied by said reference signal; wherein said main weighting function generator further includes:

a main enabling circuit for generating non-uniform weighting function W comprising an integer number 'n' of weighting values: $\{W_1^m; W_2^m \ldots W_n^m\}$; and a main correlation function generator connected to said main weighting function generator for generating a main correlation signal by correlating said reference signal multiplied by said main weighting function with a locally generated replica of a satellite signal, wherein said main correlation signal includes said main multipath pseudorange error signal;

at least one additional tracking satellite channel for tracking said composite signal from said satellite, wherein each said additional channel circuit processes said composite signal and generates an additional satellite pseudorange estimate signal and an additional multipath pseudorange error signal;
and a computer circuit connected to said main channel circuit and connected to each said additional channel circuit for assigning a main scaling function to said main channel circuit; for assigning an additional scaling function to each said additional channel circuit; for processing said scaled main satellite pseudorange estimate signal, said scaled main multipath pseudorange error signal, each said scaled additional satellite pseudorange estimate signal, and each said scaled additional multipath pseudorange error signal; and for minimizing said main multipath pseudorange error signal by optimizing said main scaling function and each said additional scaling function.

2. An apparatus for use in decoding a composite signal (CD) including a satellite signal from a satellite and including a multipath distortion component, said apparatus comprising:

a main tracking satellite channel circuit for tracking said composite signal from said satellite, wherein said main channel circuit processes said composite signal and generates a main satellite pseudorange estimate signal and a main multipath pseudorange error signal;

at least one additional tracking satellite channel for tracking said composite signal from said satellite, and wherein each said additional channel circuit processes said composite signal and generates an additional satellite pseudorange estimate signal and an additional multipath pseudorange error signal; wherein at least one said additional tracking satellite channel circuit further comprises:

an additional weighting correlation tracking circuit configured to generate an additional weighting correlation signal; wherein each said additional weighting correlation tracking circuit further comprises:

an additional weighting function generator for generating an additional weighting signal; wherein each said additional weighting function generator further includes:

an additional enabling circuit for generating non-uniform weighting function W comprising an integer number 'k' of weighting values $\{W_1^a; W_2^a; \ldots W_k^a\}$;

and an additional correlation function generator connected to said additional weighting function generator for generating an additional correlation signal by correlating said reference signal multiplied by said additional weighting function with a locally generated replica of a satellite signal, wherein said additional correlation signal includes said additional multipath pseudorange error signal;

and a computer circuit connected to said main channel circuit and connected to each said additional channel circuit for assigning a main scaling function to said main channel circuit; for assigning an additional scaling function to each said additional channel circuit; for processing said scaled main satellite pseudorange estimate signal, said scaled main multipath pseudorange error signal, each said scaled additional satellite pseudorange estimate signal, and each said scaled additional multipath pseudorange error signal; and for minimizing said main multipath pseudorange error signal by optimizing said main scaling function and each said additional scaling function.

3. A method for decoding a composite signal including a satellite signal and a multipath distortion component, said method comprising the steps of:

generating a reference signal by a main channel circuit;

generating a time varying main weighting signal by a main weighting circuit; wherein said main weighting signal is mixed with said reference signal;

generating a main correlation signal by correlating a locally generated replica of said satellite signal with said main weighting signal mixed with said reference signal; wherein said main correlation signal includes a main multipath pseudorange error signal;

generating at least one time varying additional weighting signal by an additional weighting circuit, wherein said additional weighting signal is mixed with said reference signal;

generating at least one additional correlation signal by correlating said locally generated replica of said satellite signal with each said additional weighting signal mixed with said reference signal; wherein said additional correlation signal includes an additional multipath pseudorange error signal;

and assigning a main scaling factor to said main channel circuit, assigning an additional scaling factor to each said additional channel circuit; closing the code and carrier tracking loops for main channel; closing the code and carrier tracking loops for each said additional channel; processing said main correlation signal and each said additional correlation signal, and actually minimizing said main multipath pseudorange error signal by optimizing said main scaling factor and by optimizing each said additional scaling factor by using a computer.

* * * * *